US008277312B2

(12) United States Patent
Matthews et al.

(10) Patent No.: US 8,277,312 B2
(45) Date of Patent: Oct. 2, 2012

(54) ROLE-PLAYING SLOT GAME

(75) Inventors: Ian Matthews, Hertford (GB); Damon Barnard, Cadiz (ES)

(73) Assignee: PartyGaming IA Limited, Hamilton (BM)

( * ) Notice: Subject to any disclaimer, the term of this patent is extended or adjusted under 35 U.S.C. 154(b) by 183 days.

(21) Appl. No.: 12/751,775

(22) Filed: Mar. 31, 2010

(65) Prior Publication Data

US 2011/0244935 A1 Oct. 6, 2011

(51) Int. Cl.
*A63F 9/24* (2006.01)
*A63F 13/00* (2006.01)

(52) U.S. Cl. ................................ 463/25; 463/16; 463/20

(58) Field of Classification Search .............. 463/16–31, 463/40–42
See application file for complete search history.

(56) References Cited

U.S. PATENT DOCUMENTS

| | | | | |
|---|---|---|---|---|
| 6,004,207 | A * | 12/1999 | Wilson et al. | 463/20 |
| 6,159,097 | A * | 12/2000 | Gura | 463/20 |
| 6,406,369 | B1 * | 6/2002 | Baerlocher et al. | 463/20 |
| 6,902,478 | B2 * | 6/2005 | McClintic | 463/16 |
| 6,939,229 | B2 * | 9/2005 | McClintic | 463/25 |
| 6,960,136 | B2 * | 11/2005 | Joshi et al. | 463/25 |
| 6,991,539 | B2 * | 1/2006 | Pacey | 463/16 |
| 7,052,392 | B2 * | 5/2006 | Tessmer et al. | 463/16 |
| 7,179,166 | B1 | 2/2007 | Abbott | |
| 7,182,690 | B2 * | 2/2007 | Giobbi et al. | 463/24 |
| 7,326,115 | B2 * | 2/2008 | Baerlocher | 463/25 |
| 7,357,715 | B2 * | 4/2008 | Kane | 463/18 |
| 7,625,281 | B2 | 12/2009 | Bilyeu et al. | |
| 7,666,091 | B2 | 2/2010 | Joshi et al. | |
| 7,922,575 | B2 * | 4/2011 | Jankowski | 463/20 |
| 2002/0025846 | A1 * | 2/2002 | Bennett et al. | 463/20 |
| 2002/0107068 | A1 * | 8/2002 | Baerlocher et al. | 463/20 |
| 2003/0064794 | A1 * | 4/2003 | Mead et al. | 463/25 |
| 2003/0069057 | A1 * | 4/2003 | DeFrees-Parrott | 463/16 |
| 2003/0104860 | A1 * | 6/2003 | Cannon et al. | 463/25 |
| 2003/0114219 | A1 * | 6/2003 | McClintic | 463/25 |
| 2003/0114220 | A1 * | 6/2003 | McClintic | 463/25 |
| 2005/0059473 | A1 * | 3/2005 | Gomez et al. | 463/20 |
| 2005/0282624 | A1 * | 12/2005 | Kane | 463/25 |
| 2006/0030400 | A1 | 2/2006 | Mathis | |
| 2007/0259713 | A1 * | 11/2007 | Fiden et al. | 463/25 |

(Continued)

OTHER PUBLICATIONS

International Searching Authority (ISA/EPO), International Search Report (Declaration of Non-Establishment of ISR) and Written Opinion of the ISA, for PCT/EP2010/055060, Mailing Date Aug. 2, 1010, 9 pages.

*Primary Examiner* — Milap Shah
(74) *Attorney, Agent, or Firm* — Beem Patent Law Firm

(57) ABSTRACT

A game that includes both a slot-type game portion and a role-playing-type game portion. The game may include a plurality of characters with various abilities that may have modifiable values. The slot game may allow the player to play multiple lines and may include a multiplier that augments the value of any prize on any winning line. In addition, the slot game may include ability-related symbols on its reels, whereby an ability value for a selected character may be increased if the ability-related symbol appears on the reels after a spin. The role-playing type game may include features or subgames related to the abilities, where the features allow the character to compete to increase the ability values and to win additional prizes or compensation. Successfully completing a feature may be a random event, like the spin's of the slot game, or, alternatively, success may depend on the player's skill or ability.

20 Claims, 17 Drawing Sheets

52

U.S. PATENT DOCUMENTS

2007/0298856 A1* 12/2007 Gilmore et al. ................. 463/16
2008/0220846 A1* 9/2008 Okada ............................. 463/20
2008/0293473 A1* 11/2008 Fiden et al. ..................... 463/16
2008/0311973 A1* 12/2008 Jaffe ............................... 463/20
2009/0061999 A1 3/2009 Popovich et al.
2010/0056243 A1 3/2010 Czyzewski et al.

* cited by examiner

50

50

50

52

52

52

ROLE-PLAYING SLOT GAME

BACKGROUND OF THE INVENTION

1. Field of the Invention

The present invention is directed to a system and process for electronic gaming that provides for an interactive, role-playing slot game.

2. Description of the Related Art

Slot machines and slot-type games feature a number of spinning reels with a plurality of different symbols on each reel. Matching predetermined sets of symbols across a line results in a player winning a predetermined amount of compensation (money, credits, etc.). Slots may be pure games of chance, in that the player has no control over the outcome. While these games are popular for the chance to "hit it big" or because they may not require the strategy and attention of other games such as poker, they also have the drawback of being largely repetitive. Since it may be difficult to keep a player interested in the game over an extended period of time, the game provider may offer bonuses or progressive jackpots to try to entice the player to keep playing. While each of these options may lead to increased play, they also may result in a lower hold, i.e., a smaller profit, for the slot operator.

What is needed is a game that overcomes the drawbacks described above.

BRIEF SUMMARY OF THE INVENTION

In one aspect, a game operable on a computer may comprise a slot game and a role-playing game, where the slot game and the role-playing game are arranged around a common theme, and the role-playing game may be accessed based on the results of the slot game. The slot game may include a multiplier, and both the slot game and the role-playing game may include opportunities for a player to increase the multiplier. Whether the player is successful at these opportunities may be a random event, or it may depend on the player's skill level for one or more different skills. In addition to the opportunity to increase the multiplier level, both the slot game and the role-playing game may provide the player with the opportunity to receive compensation.

The slot game may include a plurality of reels displaying a plurality of symbols, including at least one ability symbol corresponding to each of the plurality of abilities. In this case, the value of an ability is increased when the corresponding ability symbol is displayed on one of the reels at the end of a spin. Similarly, successfully completing a feature, i.e., an opportunity in the role-playing game, may increase the value of an ability. The game also may include a plurality of characters from which the player can select, with each of the characters having a plurality of abilities that may be quantified using variable values. If the selected character has multiple abilities, then the lowest value among each of the abilities may determine the value of the multiplier. The game may include continuity features such that the player may exit, logoff, and/or close the gaming session, reopen the game and start a new gaming session, and maintain the multiplier and character ability levels from the earlier session.

In another aspect, a game may comprise a slot game and a role-playing game, the slot game including a plurality of reels having a plurality of symbols, a plurality of lines, wherein each line includes one symbol from each reel and wherein, for each line, each symbol is adjacent or diagonal to a successive symbol, and a multiplier that increases the amount of compensation for a successful spin. The role-playing game may include a plurality of features, wherein each feature includes an opportunity to obtain compensation and an opportunity to augment the slot game multiplier. The game also may include a plurality of characters, where a player selects a character, the character having at least one ability having a modifiable value. Each of the plurality of features may correspond to a respective ability, such that completing a feature successfully may increase the ability's value. Surpassing a minimum threshold for the ability value may increase the slot game multiplier. If the character has multiple abilities, the multiplier increase may occur once a minimum threshold for each of the ability values has been surpassed.

The game may be operable on a computer, and playing the game may include playing a first gaming session and a second gaming session. The game may be exited after the first gaming session and reopened before the second gaming session, and, for each character, the game may retain the slot game multiplier value and the ability values from the first gaming session to the second gaming session.

In still another aspect, a game operable on a computer may include a character selection screen for selecting one of a plurality of characters, each character having a plurality of abilities with modifiable values. The game also may include a slot game for obtaining compensation having a main screen displaying a plurality of reels with a plurality of symbols, a bet indicator, a bet adjuster, a number of lines played indicator, a number of lines played adjuster, and a multiplier value, wherein compensation for a winning spin is increased using the multiplier value. In addition, the game may include a role-playing game that is accessed when a predetermined symbol or symbols are displayed in said reels, said role-playing game including a plurality of features or opportunities for modifying said ability values and for obtaining compensation, wherein each opportunity is presented on a separate screen.

A player can switch characters at multiple times throughout the game, including before a first spin of the slot game, between spins of the slot game, before attempting a feature in the role-playing game, or after attempting a feature in the role-playing game. In addition, each character may have a core ability selected from among the plurality of abilities, and that core ability may have a higher initial value than the values of the other abilities.

These and other features and advantages are evident from the following description of the present invention, with reference to the accompanying drawings.

DETAILED DESCRIPTION

Figure 1:
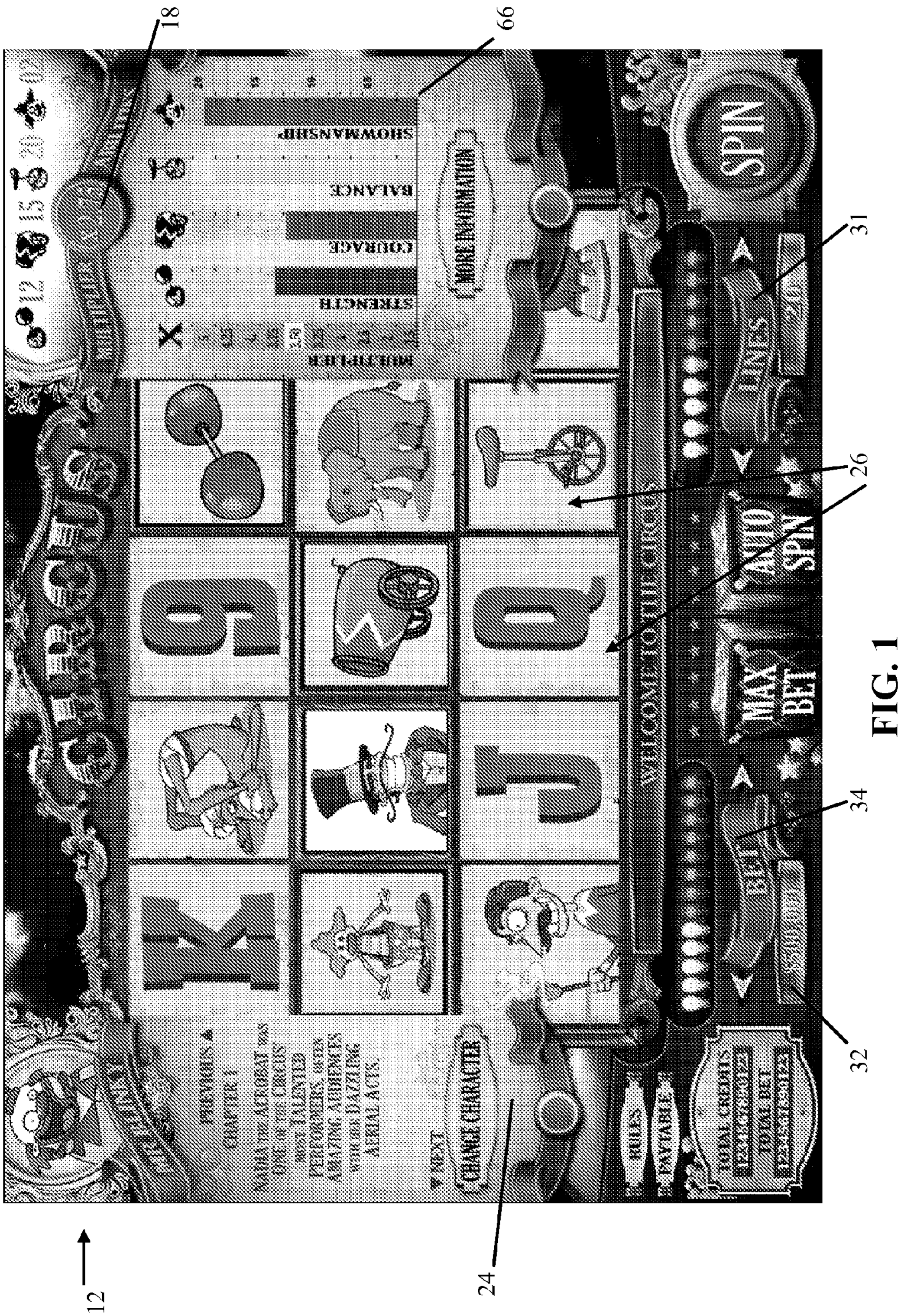
FIG. 1 is a screenshot of one embodiment of the slot portion of a role-playing slot game.

A multi-reel, multi-payline slot game with multiple subgames or features. The game also may include multiple characters from which the player must select one with which to play, either via a character selection screen or within the game itself. Characters have varying attributes that may be modified by completing and/or attempting to complete the features, and these attributes may be saved so that the player may close the game, open it at a later time, and resume playing with that character and its saved attributes. The game may entice a player to keep coming back because the player already has obtained some ability points for at least one character, which gives the player a perceived benefit of the possibility of enhanced winnings caused by a multiplier to the slot paylines.

In one embodiment, once a particular feature game is played for a particular character, it cannot be played again until all remaining features are played for that character. This option may apply to features that are completed successfully, but it also may apply to features that simply have been attempted, whether successful or not. In addition, each character may be independent of the others, such that attempting a feature for one character may not preclude attempting the same feature for another character before the remaining features have been played. This character independence also means that each character may have its own, unique attributes or its own ability point values for the same attributes as other characters.

A role-playing slot game 10 may include two distinct, but related, components: a slot-type game 12 and a role-playing-type game 14. Role-playing game 14 may include a plurality of subgames or features 16. One or both of the slot-type game 12 and the role-playing-type game 14 may be used to earn ability points, which may increase the value of a multiplier 18 applied to the result of spins in the slot-type game. For example, ability points may show up as part of a payline in a winning spin in slot-type game 12. Additionally, features 16 may comprise one or more games in which a player may attempt to complete a task. Successful attempts may result in the player earning additional ability points, which may increase multiplier 18. In contrast, unsuccessful attempts may either keep multiplier 18 at its previous level, or decrease multiplier 18 to a lower value. In either case, multiplier 18 then may be applied to the results of slot-type game 12 to increase the amount of a winning spin.

In one embodiment, both the slot portion 12 of game 10 and the features 16 within the role-playing portion 14 may relate to a central theme, which may provide a more unified experience for the user. This theme may continue through the introduction of various characters 100 that the user may select. For example, a central "circus" theme may run through the game, where the user may select a character 100 from among a plurality of circus performers. In addition, the slot portion 12 of the game may have reel symbols 22 that represent common circus elements, and the features 16 may be tasks or games that may be experienced at a circus or amusement park. In another example, a "pirate" or "shipwreck" theme may be applied.

Characters

Player can change the character 100 at any time from within the game when the game is not in progress. To change the character, the player may mouse-over the character image or icon 101, which may be displayed at top left corner of the game screen. As seen in FIG. 1, a short story for the current character may be displayed, along with a "CHANGE CHARACTER" button at the bottom. Clicking on this button may direct the player to the character selection screen 60, where the player may select one of the other characters or may exit and resume playing as the current character.

Both slot-type portion 12 and role-playing-type portion 14 may be based around a plurality of characters 100. Game 10 may include between about 2 and about 10 characters, preferably between about 2 characters and about 6 characters, and in one embodiment about 4 characters. Characters may be selected to fit within unified theme of game 10 so that, e.g., when playing a circus-themed game, characters 100 may be circus performers such as a circus animal, daredevil, gymnast or contortionist, and a clown. Characters may be represented with unique icons 101, which may assist the player in visually identifying the character under which they are playing.

Figure 2:
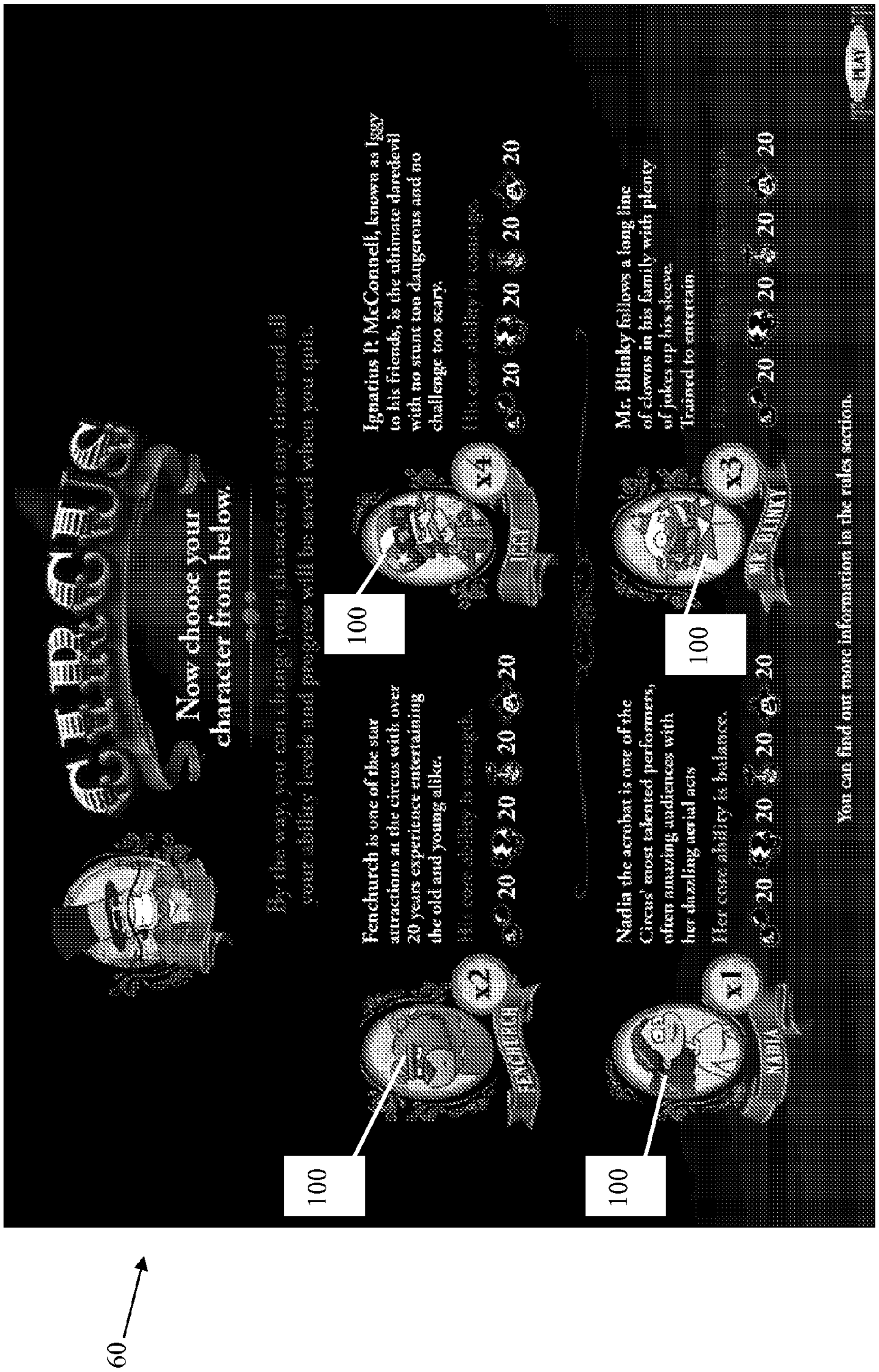
FIG. 2 is a screenshot of a character selection screen.
Figure 3A:
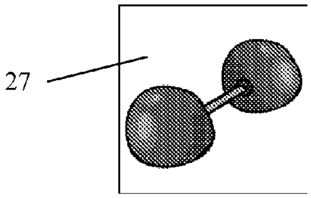
FIGS. 3A-3D are exemplary ability-specific symbols for use in a role-playing slot game.
Figure 3B:
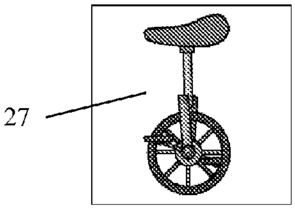
Figure 3C:
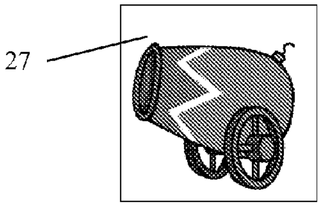
Figure 3D:
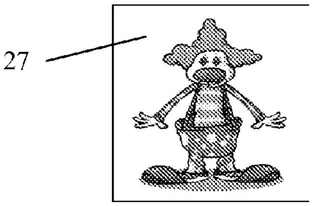
Figure 6A:
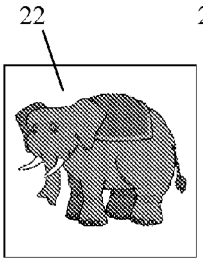
FIGS. 6A-6J are exemplary symbols for use in the reels of a slot-type game.
Figure 6B:
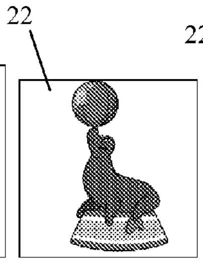
Figure 6C:
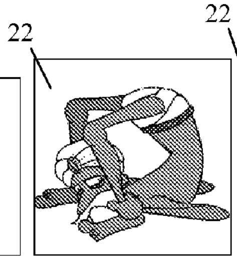
Figure 6D:
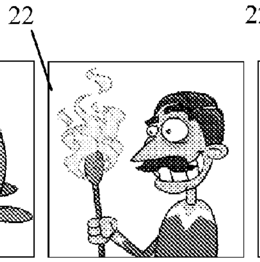
Figure 6E:
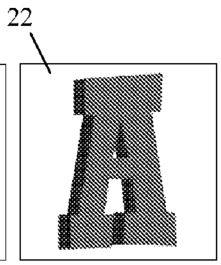
Figure 6F:
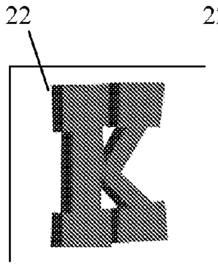
Figure 6G:
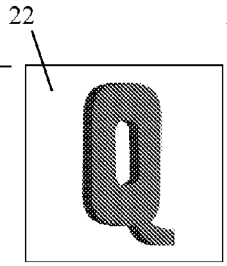
Figure 6H:
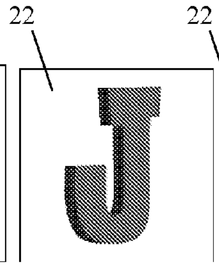
Figure 6I:
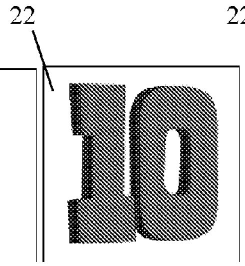
Figure 6J:
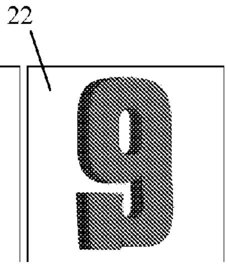

When a player starts game 100, character selection screen 60 may prompt the player to choose one of the characters 100 to play as. As seen in FIG. 2, character selection screen 60 may include character icons 101, a brief narrative about each character, the character's multiplier value 18, the character's ability points 104, and the character's predisposed ability 102.

The player may use the selected character to play a new game, where the character's abilities 102 (described below) are set to default levels. Alternatively, game 10 may allow the player to save his or her progress at the end of a session, log out, and then log back in and restart another session at a later time, with the later session's characters retaining the abilities 102 from the previous session. In addition, game 100 may allow the player to save one character's session and load a different character's session. Character abilities 102 or multipliers 18 may not transfer from one character to another, but other values such as the number of lines 28 played, wager amount 32, or total credits may be transferable.

If the player gets disconnected in the middle of the slot-type game 12, the software preferably automatically completes the game. The player may be able to find out the result by clicking on a "Game Logs" button once he has logged back in. If the player gets disconnected after triggering a feature 16 or in the middle of a feature 16 in role-playing-type game 14, on reconnection the software preferably automatically starts the feature, if not already started, or resumes from where it was disconnected.

Multiple screens of the slot-type game 12, including main screen 24 and paytable 50, may include character icon 101 to remind the player of the character 100 that is being used. In addition, the player may elect to change characters, e.g., by clicking on icon 101, which may display information about the character, e.g., the character's abilities 102, and also may display a "change character" link.

Each character 100 has a plurality of abilities 102. For example, each character 100 may have between about 2 and about 10 abilities, preferably between about 2 and about 6 abilities, and in one embodiment about 4 abilities. Examples of these abilities 102 may include Strength, Balance, Showmanship, and Courage, although other abilities such as Memory, Speed, Dexterity, Concentration, Reflexes, etc., are possible.

In one embodiment, each character's default point level for each ability may be set to zero. Preferably, however, each character 100 may be better suited to a certain ability. In the circus theme, for example, the circus animal may be best at Strength, the daredevil may be predisposed to have a high Courage ability, the contortionist may exhibit excellent Balance, and the clown may excel at Showmanship, as shown in FIG. 2. As such, each of these players may have seeded ability points 104 for their respective strengths, e.g., if ability may be graded on a scale from 0 to 20 points, each player may start with two or three ability points for these core abilities and zero for the other abilities.

A character 100 may earn extra ability points 104 in two ways:

1. In the slot-type game 12, an ability-specific reel symbol 27 for one of the abilities 102 lands in view. Each ability-specific symbol 27 that lands in view may add a predetermined number of ability points 104, e.g., one ability point, to the ability 102 it represents. Examples of ability specific symbols are shown in FIGS. 3A-3D, where a weight corresponds to Strength, a unicycle to Balance, a cannon to Courage, and a clown to Showmanship.

2. In the role-playing-type game 14, playing and completing a feature 16 successfully, may add a point to the ability 102 around which the feature is based. There may be an equal number of features 16 in game 14 for each ability 102, e.g., four features each for Strength, Courage, Balance, and Showmanship. Examples of ability-specific features and the ways in which ability points may be earned are described in the role-playing-type game section below.

The effect of ability points is discussed below, after the description of the role-playing type game 14.

Slot-Type Game Portion

Figure 4:
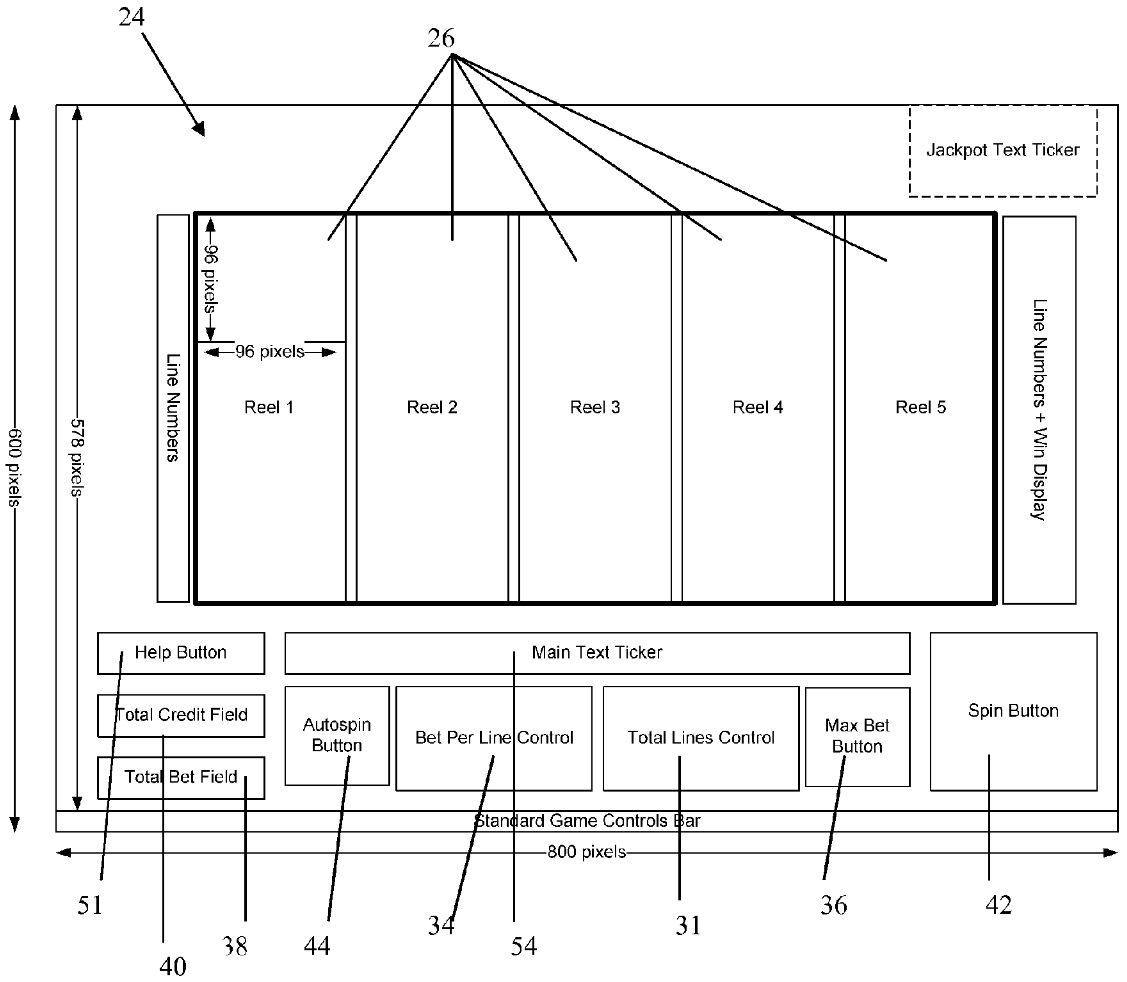
FIG. 4 is a sample layout of a slot-type game.
Figure 5:
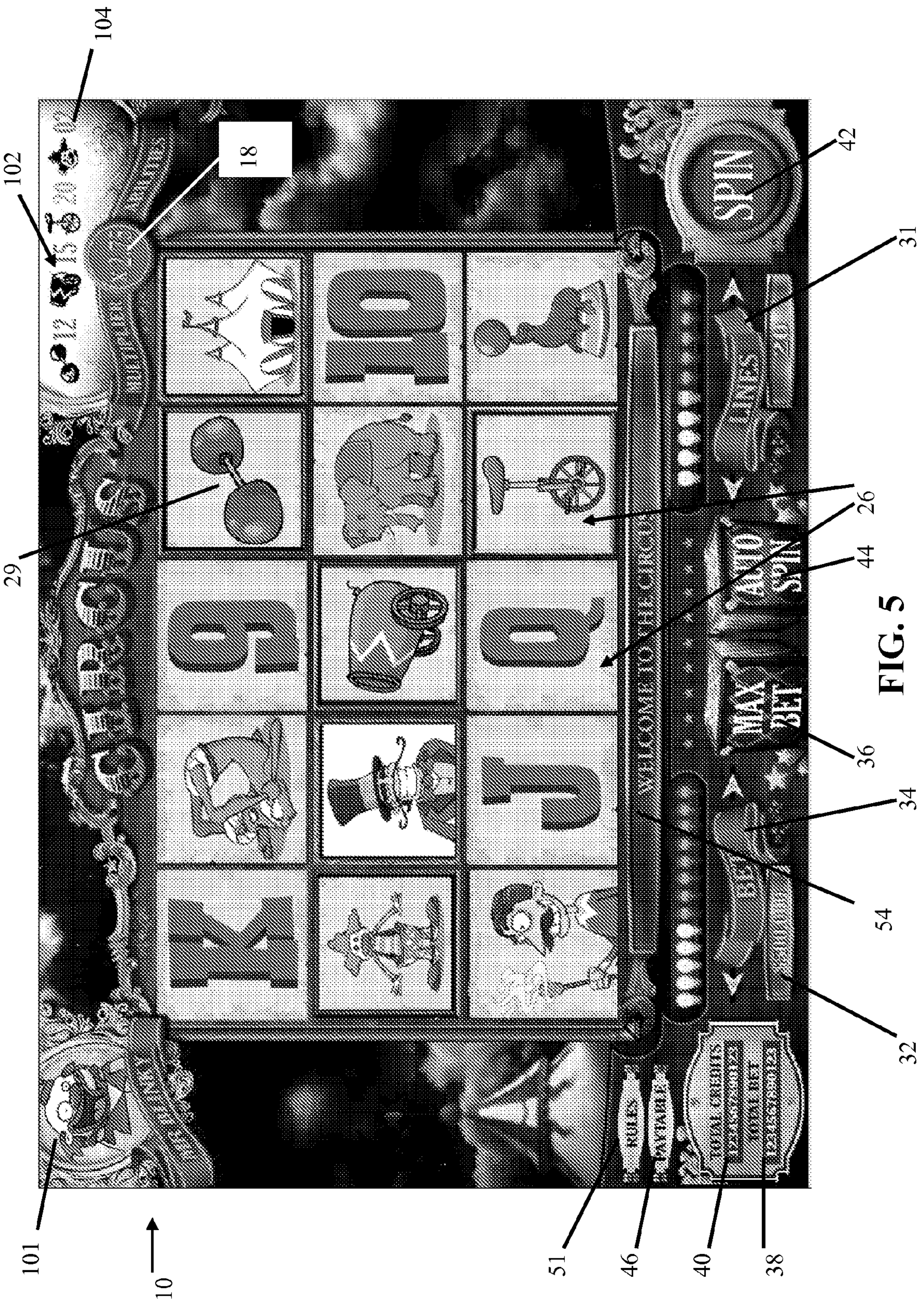
FIG. 5 is a second screenshot of the slot portion of a role-playing slot game.

Turning to the slot portion 12 of the game 10, an exemplary main screen 24, viewable in a window on a computer display, may have a layout similar to the template shown in FIG. 4 or the screenshot of FIG. 5. Elements within the screen are discussed below in greater detail. The position and size of elements in the main screen may be modifiable for each iteration or game within the slot portion 12. Preferably, however, the overall layout may remain generally the same from game to game, which may provide a sense of continuity and familiarity to the user.

Reels 26: Each reel 26 may hold a plurality of symbols 22, and a select number of symbols 22 may be displayed to the user, e.g., in a column. Preferably, three symbols are shown in each column, although greater or fewer symbols are possible. Slot-type game 12 may include a plurality of reels 26, preferably between 3 and 7 reels, still more preferably about 5 reels, although more or fewer reels 26 are possible. Exemplary symbols 22 are shown in FIGS. 6A-6J.

Figure 7A:
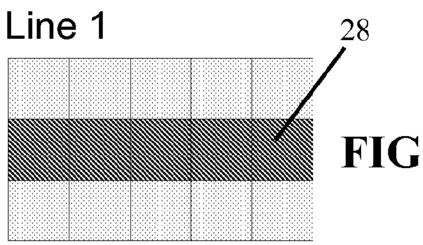
FIGS. 7A-7T are sample winning line combinations for a slot-type game.
Figure 7B:
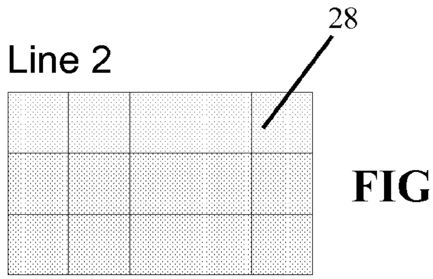
Figure 7C:
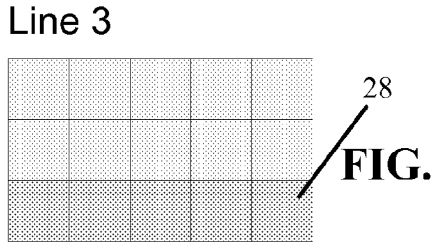
Figure 7D:
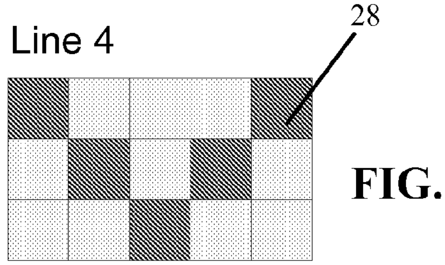
Figure 7E:
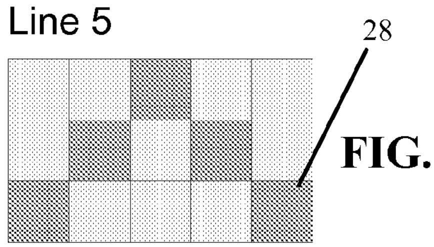
Figure 7F:
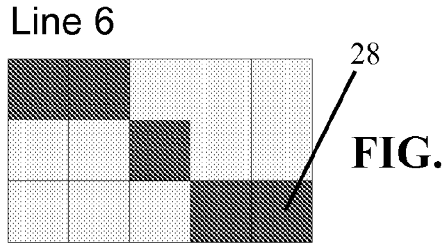
Figure 7G:
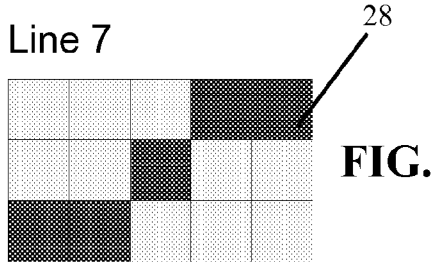
Figure 7H:
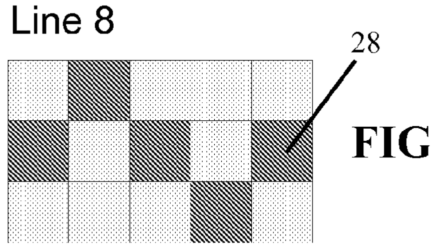
Figure 7I:
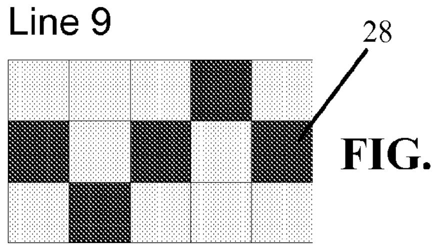
Figure 7J:
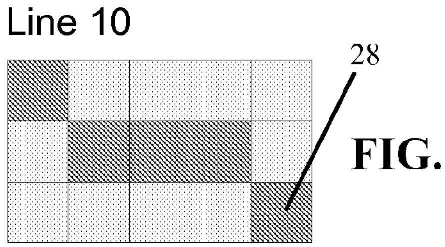
Figure 7K:
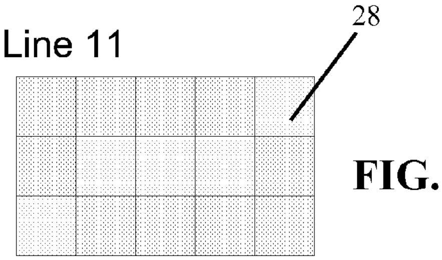
Figure 7L:
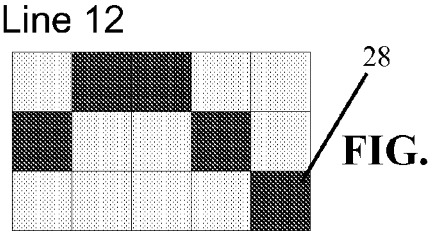
Figure 7M:
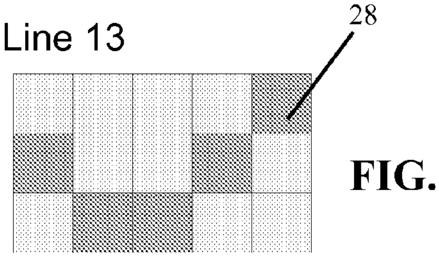
Figure 7N:
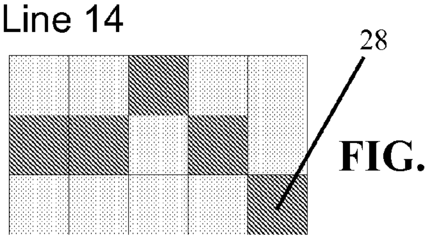
Figure 7O:
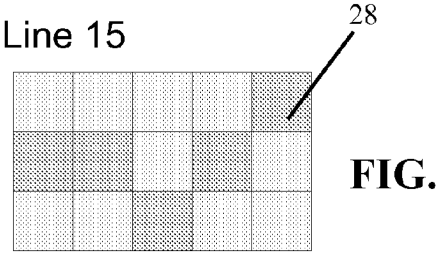
Figure 7P:
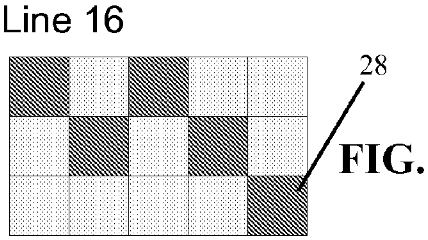
Figure 7Q:
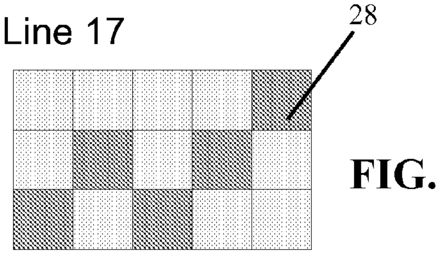
Figure 7R:
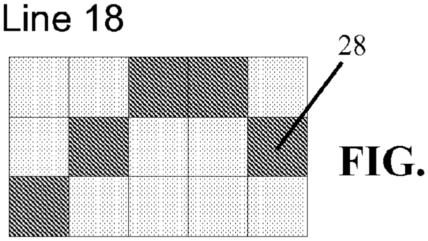
Figure 7S:
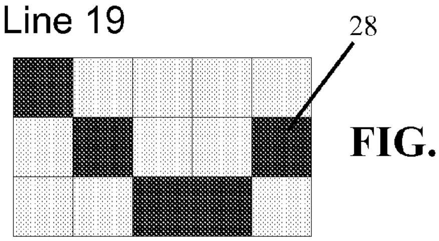
Figure 7T:
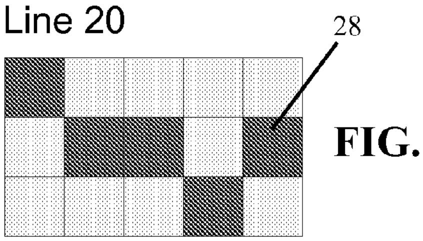

Layout of lines 28: The slot-type game 12 preferably employs line slots. In one embodiment, a winning spin may be determined solely by the symbols displayed across the central boxes of each reel 26. In another embodiment, multiple line configurations may be employed and analyzed as potentially winning combinations. Various possible line configurations are shown in FIGS. 7A-7T. Each line 28 may refer to a sequence of connecting boxes from reel to reel, and at least one winning combination may exist for each line 28. Each line 28 may include one symbol 22 per reel 26, and, for each line 28, each symbol 22 may be directly or diagonally adjacent to the next symbol in the next reel 26.

Figure 8:
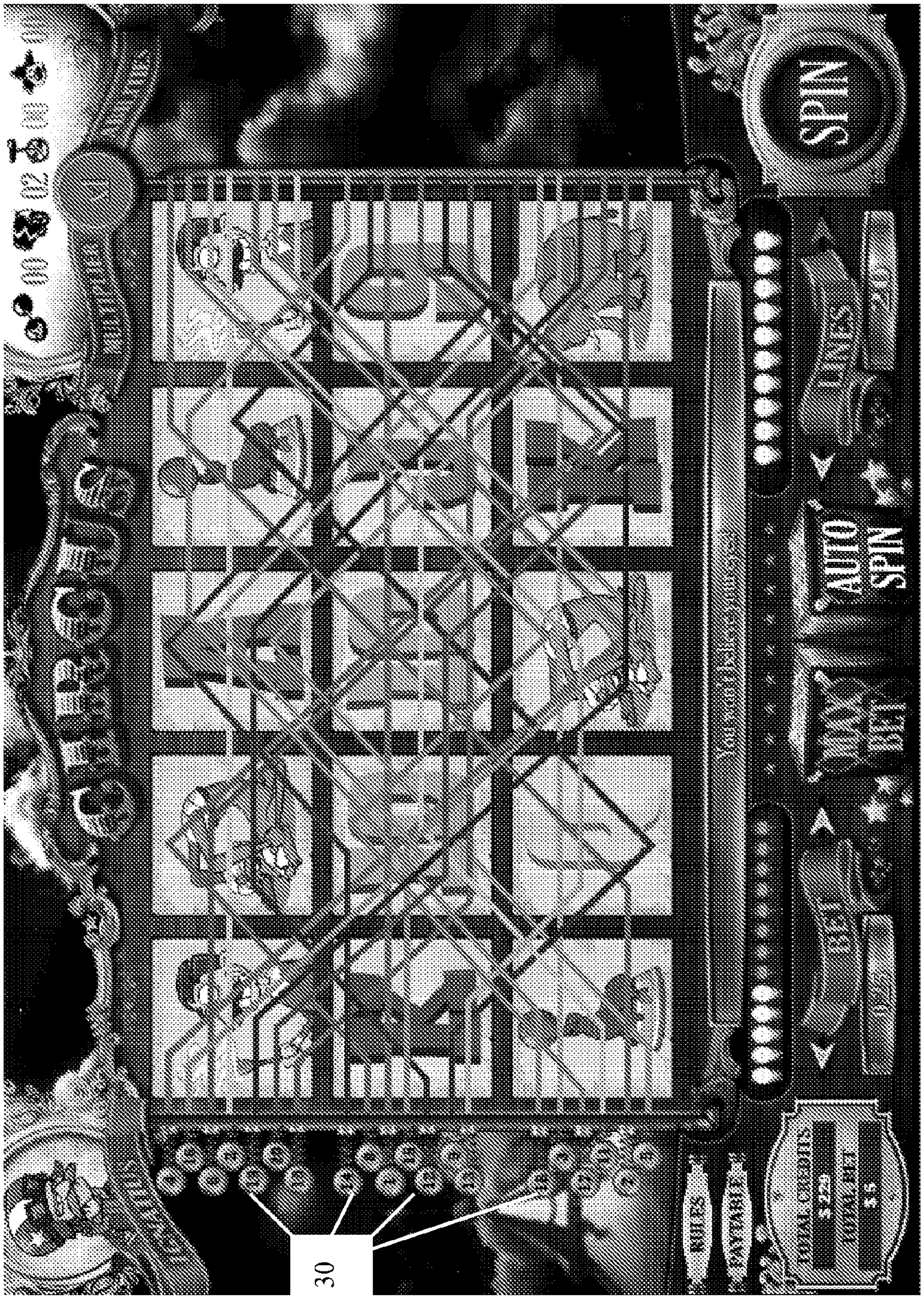
FIG. 8 is a screenshot of one embodiment of a role-playing slot game showing possible line indicators.
Figure 9:
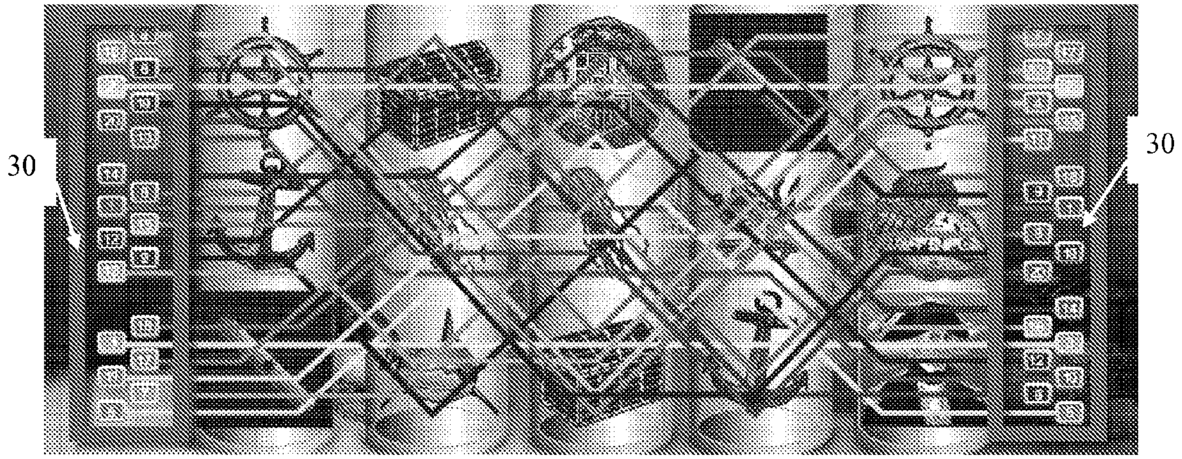
FIG. 9 is a screenshot of a second embodiment of a role-playing slot game showing possible line indicators.

Turning to FIGS. 8 and 9, the main game screen 24 may include line number indicators 30, e.g., to the left and/or right of the reels 26. Each line 28 and/or indicator 30 may have two states, i.e., a highlighted or active state and a greyed out or inactive state. When active, each line 28 and each indicator 30 may be represented by a distinct color, and colors may be selected to fit with a color palette of the rest of the slot-type game 12. Colors also may be selected for their ability to show up against the background.

Figure 10:
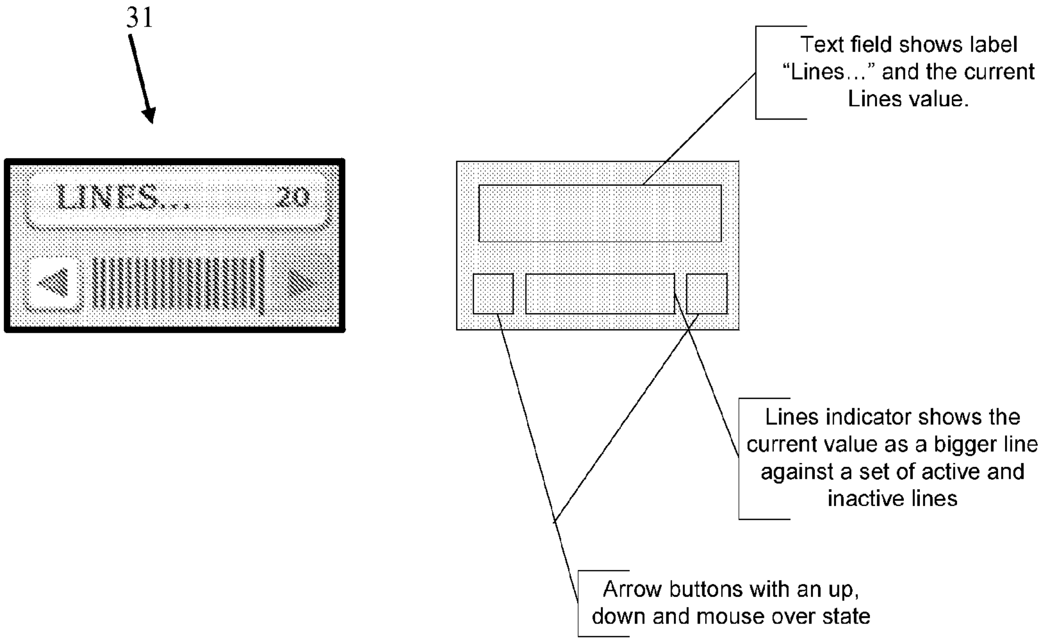
FIG. 10 is a mock-up of a possible line adjustment meter for use in a role-playing slot game.

A user may select both the number of lines he wishes to play and the specific line or lines from among those offered by the system. The user may select to play one line, the maximum number of lines, or any number in between. In one embodiment, all possible lines may be selected by default. This choice may be modified by the user, e.g., by clicking on a desired line number or the appropriate line indicator 30. Screen 24 also may include a line toggle capability 31 such as one or more arrow buttons to let the user toggle between the various line possibilities and an indicator to display the current relative number of selected lines 28, as seen in FIGS. 5 and 10. In FIG. 10, the indicator may be a sequence of light bulbs where each bulb may get progressively brighter as the increasing arrow is selected, until a maximum brightness is reached, followed by the next bulb starting to brighten. Toggling among line possibilities may be accompanied by an audible indicator. For example, each possible line or each selection of a number of lines to play may have an accompanying indicator, such that an appropriate sound is played as the selected line(s) or the number of lines is changed. Sounds associated with each line may increase in pitch, e.g., in an ascending scale, as the user increases the number of lines selected and may decrease in pitch, e.g., in a descending scale, as the user decreases the number of lines selected.

Figure 11:
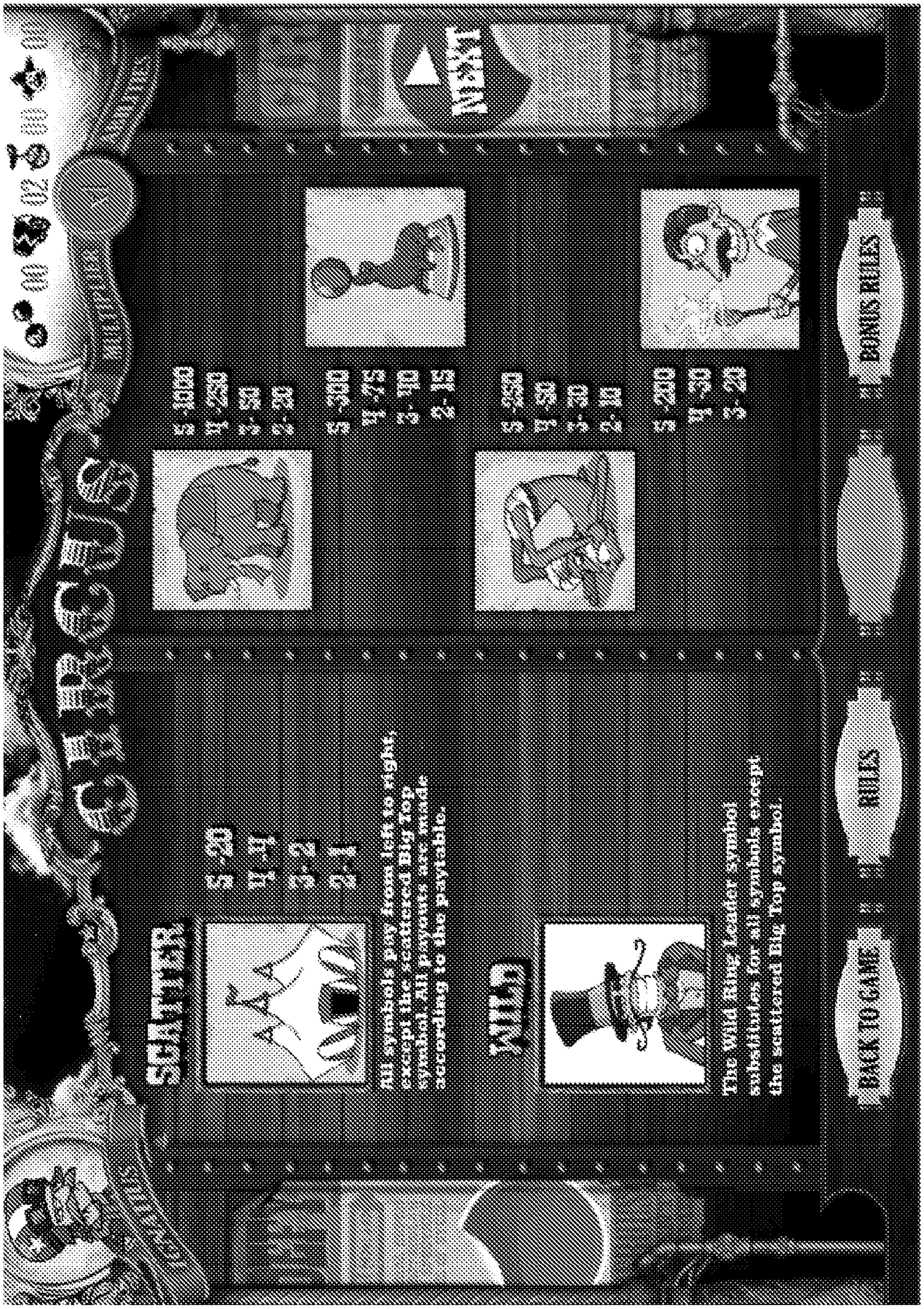
FIG. 11 is a screenshot of one embodiment of part of a paytable of a role-playing slot game.
Figure 12:
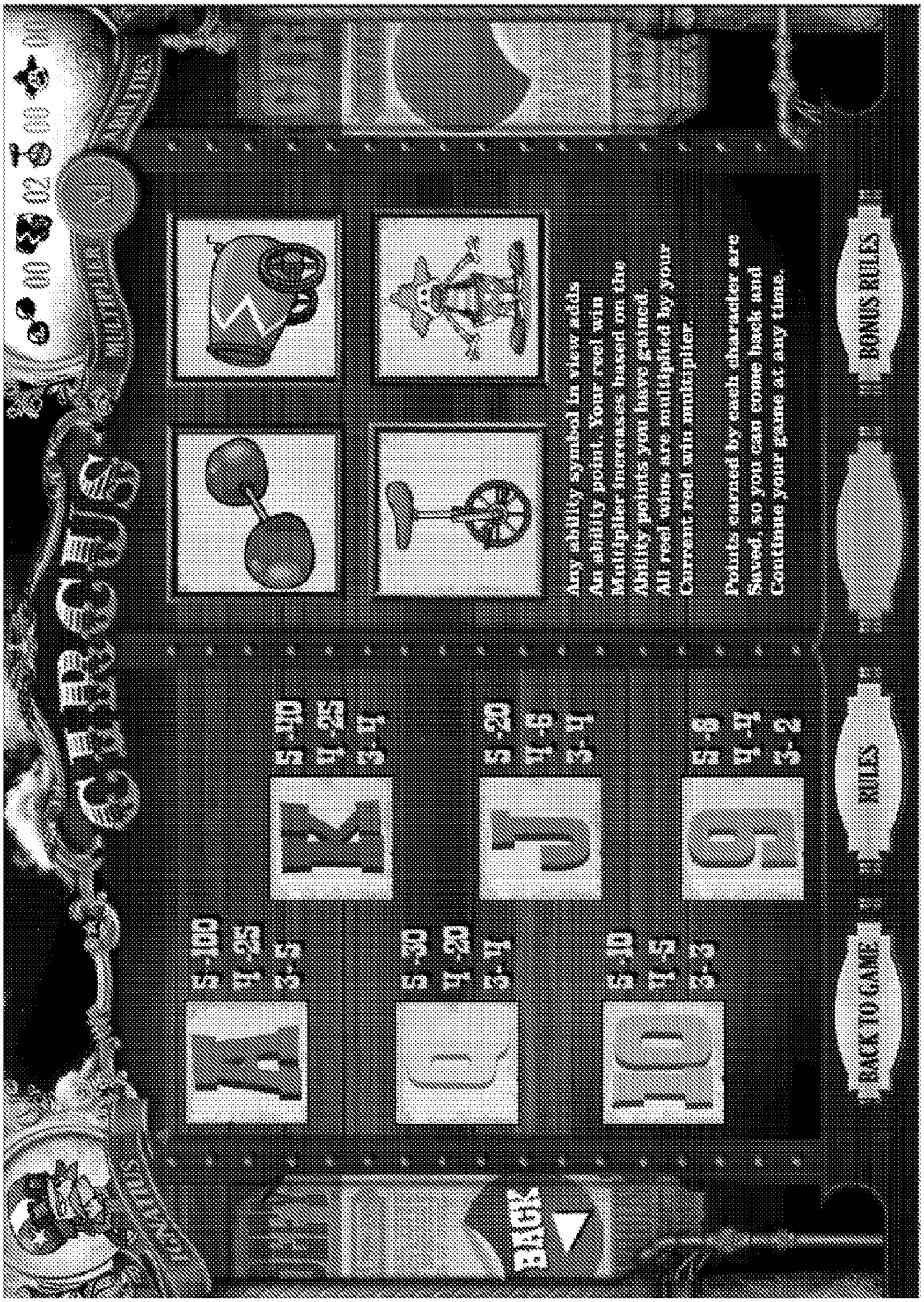
FIG. 12 is a screenshot of one embodiment of second part of a paytable of a role-playing slot game.
Figure 13:
FIG. 13 is a screenshot of a second embodiment of part of a paytable of a role-playing slot game.

Preferably, payout rules are the same for all four characters 100. However, the payout for each line 28 may differ, and the user may be able to view the respective payouts by selecting "PAYTABLE" indicator 46, which may open a separate display screen 50 showing these payouts, as seen in FIGS. 11-13. To calculate a payout amount, the user can multiply the respective prize for a desired line or lines with the bet per line.

Figure 14:
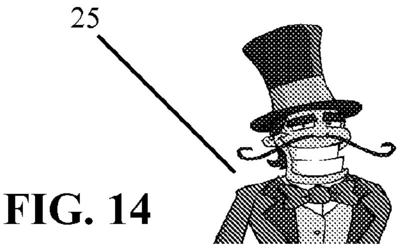
FIG. 14 is an exemplary substitute or wild card symbol.
Figure 15:
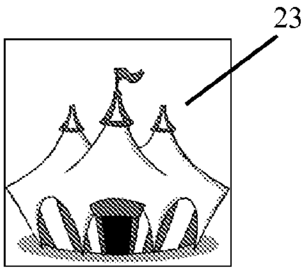
FIG. 15 is an exemplary scatter symbol.

The slot-type game 12 may include one or more wild card or substitute symbols, such as the wild-card Ringleader symbol 25 shown in FIG. 14, and one or more scatter symbols, such as the Big Top symbol shown in FIG. 15. The paytable screen 50 preferably shows the rules regarding these wild card and scatter symbols. For example, to calculate the payout when a wild card symbol is included in a selected line, multiply the respective prize that would occur when another symbol is substituted for the wild card symbol 25 with the per-line bet.

The paytable screen 50 may be accessible from main screen 24. Additionally, or alternatively, the user may access paytable screen 50 from a help or rules screen 52. As such, paytable screen 50 may include links 54 back to one or more of main screen 24 and rules screen 52.

In addition to the number and choice of lines, a user's bet also may depend on a wager amount 32. Wager amount 32 may vary to attract a wide range of players, e.g., a minimum bet amount may be $0.01 and a maximum bet amount may be $1000, which may entice players ranging from very conservative to very aggressive. Wager amount 32 may be a set amount, whereby the wager per line amount is the set amount divided by the number of selected lines. Preferably, however, wager amount 32 also may be displayed on a per line basis. For example, when a player enters the game, a default bet of $0.25 per line for all 20 lines may be displayed, resulting in a total wager amount 32 of $5.00.

Figure 16:
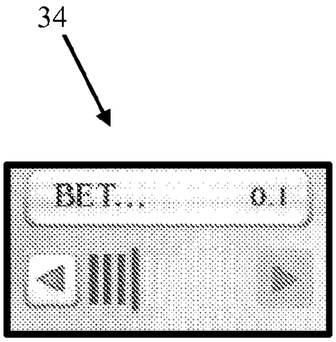
FIG. 16 is a mock-up of a possible bet adjustment meter for use in a role-playing slot game.
Figure 16:
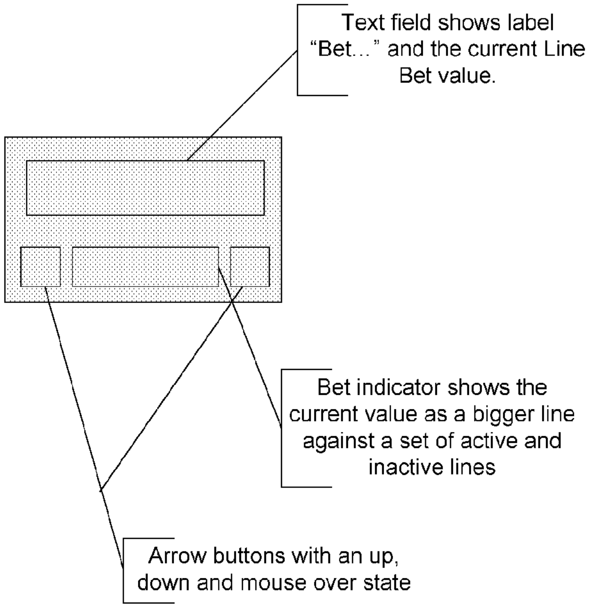

Screen 24 may include a "BET" or similar indicator 34 with toggling options such as arrow buttons to allow the player to increase or decrease the bet per line, as seen in FIGS. 5 and 16. Audible sounds may accompany adjustments to the bet amount, with a positive-sounding tone accompanying an increased bet and a negative-sounding tone accompanying a decreased bet. Bet indicator 34 also may include a visual representation of the increase or decrease, such as the progression of lit bulbs in FIG. 8 or the lit lines in FIG. 16. If the player's total game balance is less than the default amount, the system automatically may adjust the bet 32 to the next highest possible amount.

Staying with FIG. 5, screen 24 also may include a "MAX BET" or similar indicator 36. The "MAX BET" button 36 will increase the Bet-per-Line and the Lines values to their maximums, provided the user has enough credit. In the previous example that includes twenty possible lines 28 and a maximum wager amount 32 of $1000, selecting the MAX BET indicator 36 may cause the player to play all twenty lines with a bet of $50 per line. If the user does not have enough credit, the "MAXBET" button 36 preferably first increases the Lines value and, second, increases the Bet-per-Line value to the maximum that is possible given the user's balance. In another embodiment, MAX BET indicator 36 may be disabled if the game balance is insufficient.

Display screen 24 may include a "TOTAL BET" meter 38 for displaying wager amount 32, i.e., the total bet to be placed on the next spin. In one example, the "TOTAL BET" meter 38 may display up to about 3 currency unit numbers (allowing a total balance of 999 units) and up to 2 sub-unit numbers (i.e., 0.99 sub-units), as well as a currency symbol, e.g., "$," and a full stop to punctuate the total value. In this example, the maximum value therefore may be $999.99. In another example, the meter 38 may allow for more currency unit numbers, such as the case above where maximum wager amount 32 was $1000. "TOTAL BET" meter 38 may be displayed proximate a "TOTAL CREDITS" meter 40, as seen in FIG. 5, so that the user easily may be able to compare the wager for a game with the amount he has available to wager. In this case, "TOTAL BET" meter 38 may have a field size generally equal to that for "TOTAL CREDITS" meter 40.

After a bet has been placed, the user's remaining game balance may be displayed in the "TOTAL CREDITS" meter 40. The amount shown in "TOTAL CREDITS" meter 40 may be the total credit the player has brought to the game minus the amount that would be wagered on the next spin. Similarly, the user's current game balance is the sum of the amounts displayed in the "TOTAL BET" meter 38 and the "TOTAL CREDITS" meter 40. In one example, "TOTAL CREDITS" meter 40 may be able to display up to 8 currency unit numbers (allowing a total balance of 99,999,999) and up to 2 sub-unit numbers (to allow up to 0.99 sub-units). The meter also may include a currency symbol, e.g., "$," and up to 2 commas and 1 full stop to punctuate the total value. As such, the maximum value that can be shown in this field in this example is $99,999,999.99.

Once the number of lines to be played and the total bet have been selected, the user may play slot-type game 12 by selecting a "SPIN" indicator 42, which may start spinning the reels 26. Spinning reels 26 may be represented by a spin blur, i.e., images in reels 26 are blurred to give the impression that reels 26 are spinning rapidly.

As reels 26 stop spinning, symbols 22 become visible. For each reel, as soon as a scatter symbol 23 or a substitute symbol 25 is shown, a special sound and/or visual indicator may be employed. This is played before later reels have finished spinning but should not make these later reels take any longer then expected to stop.

After all reels 26 stop spinning, one of the following events occurs: no win, a single line win, a multi-line win, and/or a free spin. No win happens when neither a scatter win nor a single line win occurs. A single line win occurs when a winning combination, as indicated in paytable 50 (including a scatter win) appears on only one line 28. A multi-line win may include a plurality of standard line wins or a scatter win plus one or more standard line wins.

When no win occurs, game 10 may not take any special action. Instead, the user can press Spin to spin again.

Figure 17:
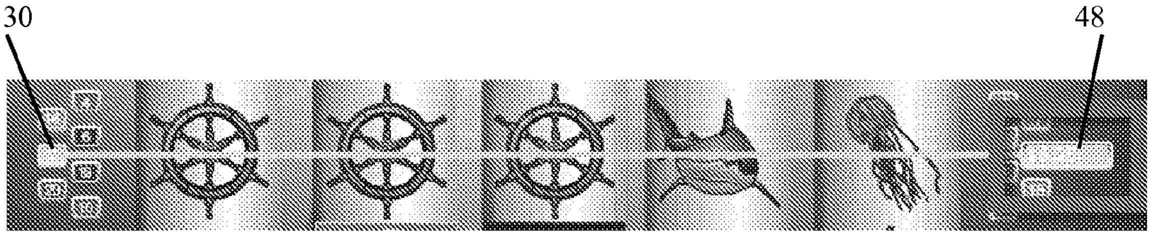
FIG. 17 is a screenshot of a line indicator showing a winning line.

When a single line win occurs, a Single Line win sound may be played after the last reel stops. In addition, the main text ticker 54 may be updated to show the win value. As seen in FIG. 17, a payline then may be shown over the winning line symbols for a short period of time, e.g., about 0.5 seconds, which may be followed by animating the symbols and playing associated sounds.

Single-line wins may be indicated by highlighting their paylines, displaying a winning icon at the end of each winning line, and/or by animating the appropriate reel symbols 22. A Win Display 48 may include a small tab that appears over the Line Number display 30 on the right hand side of the reels 26 with the winning amount displayed inside the tab, as seen in FIG. 17. Win Display 48 may be the same color as line number indicator 30.

If the win is a scatter win, then neither a highlighted winning tab nor a payline may be indicated. In this case, a win may be indicated solely by animating reel symbols 22. Any winning combinations on the selected lines 28, or any scatter wins, may be paid according to the paytable.

When a multi-line win occurs, a different, multi-line win sound may be played after the last reel stops, and the main text ticker 54 may be updated to show the total win value. In addition, the following steps described above for single-line wins may occur for each winning line, in order of the highest value win to the lowest value win. This cycle may repeat itself until it has occurred for all winning lines or until the user takes some affirmative action, e.g., hitting the enter key or pressing the "SPIN" button 42. If the user has triggered the bonus or role-playing-type game 14 (described below), that game may be launched after completing the total win display and the cycle through all wins may not be done.

Slot-type game 12 also may provide the player with a free spin instead of, or in addition to, a single line win or multi-line win. In this case, an animation may be played, and main text ticker 54 may show the number of spins left, having been updated to reflect the free spin. If multiple free spins are provided, the system may display the number of spins left, start reels 26 spinning, and decrement the number of spins left as they start spinning. When reels 26 are spinning, ticker 54 may display a total amount won during spins so far. When reels 26 stop spinning, ticker 54 and/or line indicators 30 may display the amount won during that spin. These steps may be repeated until all spins are complete, at which point ticker 54 may display the total won during free spins.

In the event that a player wishes to play the same lines and bet, the system may include an "AUTOSPIN" feature or indicator 44, which may include various options for "hands free" game play. The system may include various autospin options, including:

Number of spins: The player may select a desired number of spins, e.g., via a drop-down menu, and the game automatically spins for that number of spins.

Spin until win is equal to or exceeds: The player may select a win amount, and the game automatically spins until the win amount is equal to or exceeds the selected amount.

Spin until any win: The game automatically spins until the next win.

Spin until feature trigger: The game automatically spins until the next feature 16 is triggered.

Spin until balance exceeds or is equal to: The user may enter a desired value, and the game automatically spins until the game balance is greater than or equal to the amount entered. As described above, the "game balance" may be the sum of the amounts given under the "TOTAL BET" meter 38 and the "TOTAL CREDITS" meter 40.

Spin until balance falls below or is equal to: The user may enter a desired value, and the game automatically spins until the game balance is less than or equal to the amount entered. As described above, the "game balance" may be the sum of the amounts given under the "TOTAL BET" meter 38 and the "TOTAL CREDITS" meter 40.

Play faster: This option lets the user play faster than usual by reducing the break time. This option may be selected by itself, but preferably the system may require the user to choose at least one of the other available autospin options to play with this option.

Selecting the autospin option may launch a pop-up window with autospin options such as those described above. When the autospin mode is activated, main screen 24 may indicate this by displaying an autospin icon at autospin indicator 44. Alternatively, activating autospin mode may cause autospin indicator 44 to be replaced with a "STOP SPIN" indicator, whereby selecting the "STOP SPIN" indicator may deactivate the AUTOSPIN. If a spin is in progress, deactivating the AUTOSPIN may cause the AUTOSPIN to be stopped after the current spin is completed. If a spin is not in progress, the AUTOSPIN may be stopped immediately, and a normal game mode may be restored.

Game 10 also may have a "free spins" feature, awarded at random. It will run a random number of free spins at whatever multiplier the player has from their ability points.

Figure 18:
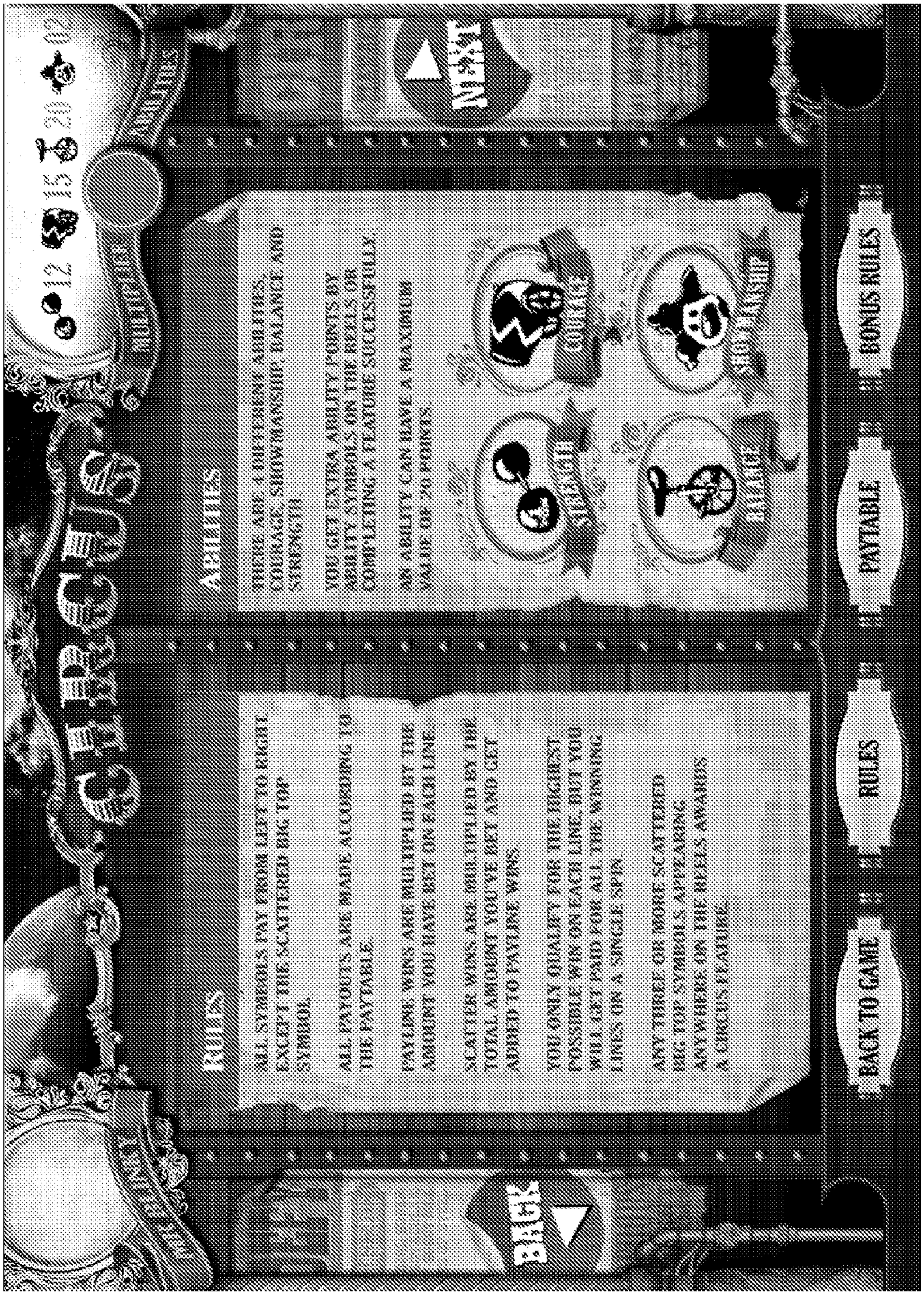
FIG. 18 is a screenshot of part of an exemplary rules menu for use in a role-playing slot game.
Figure 19:
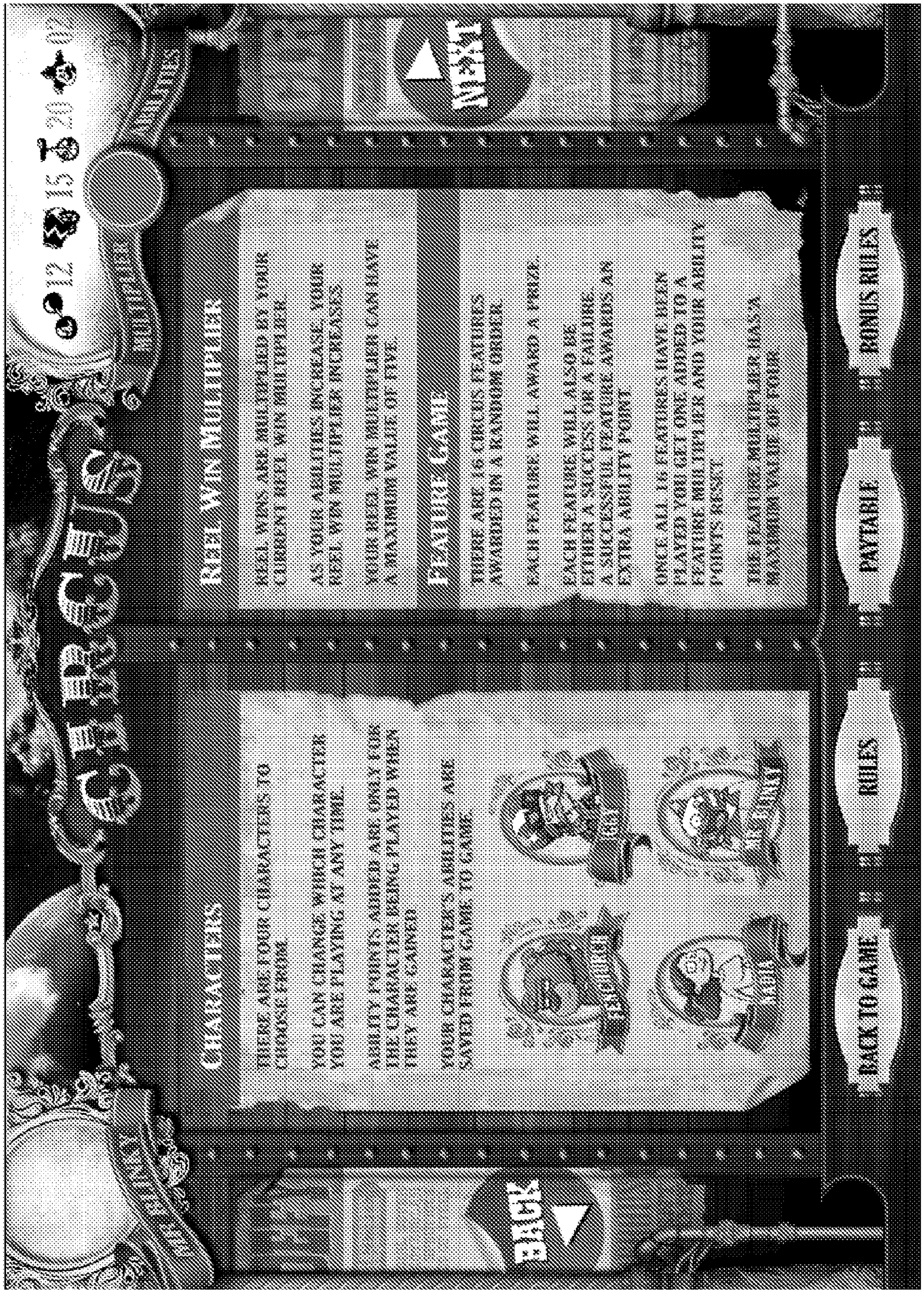
FIG. 19 is a screenshot of a second part of an exemplary rules menu for use in a role-playing slot game.
Figure 20:
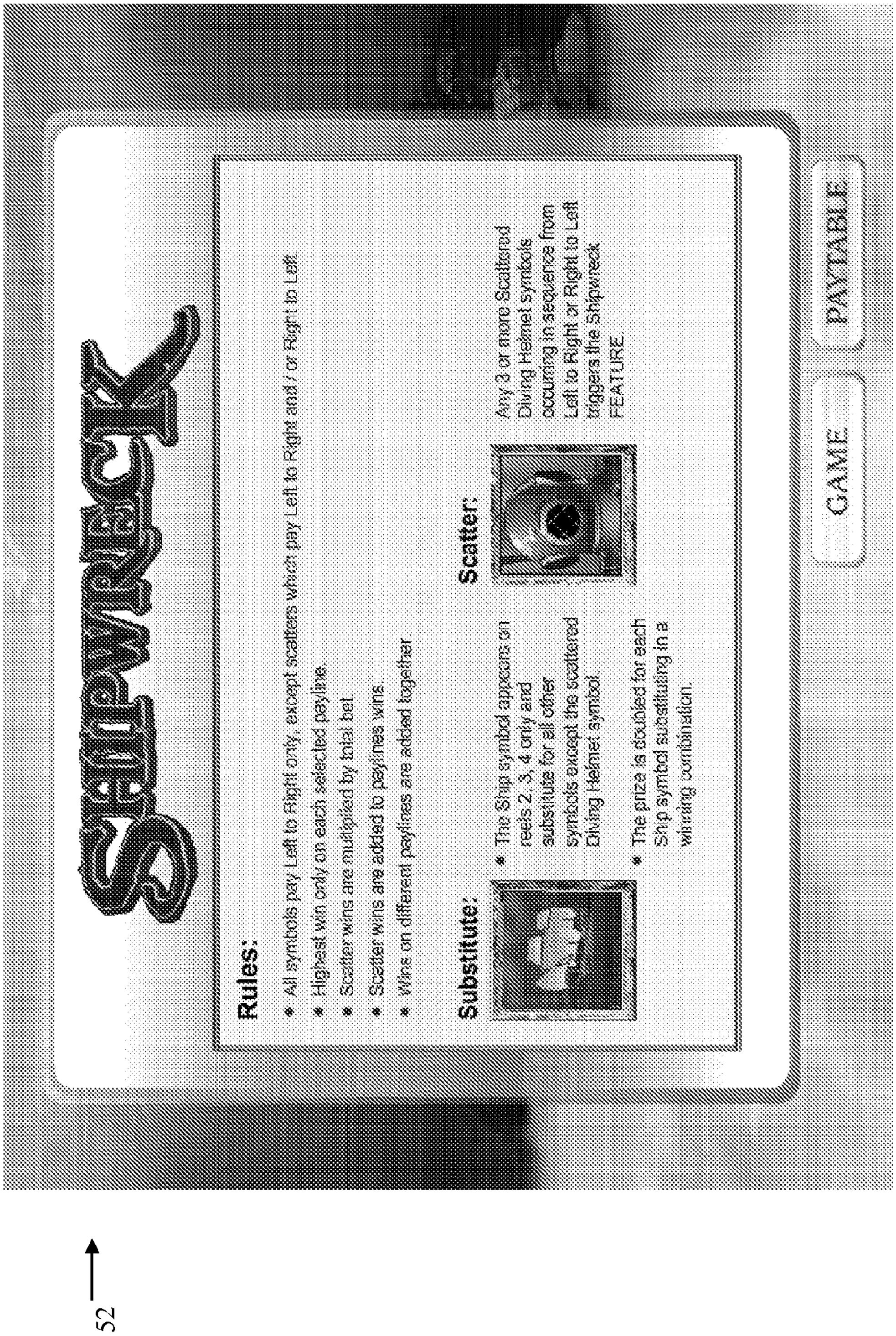
FIG. 20 is a screenshot of a second embodiment of an exemplary rules menu for use in a role-playing slot game.

Main screen 24 may include a help or rules button 51, as seen in FIG. 5. In one embodiment, selecting the rules button 51 may open help or rules screen 52. Turning to FIGS. 18-20, game 10 may include multiple rules screens 52 to display the rules of game 10 generally or slot-type portion 12 and role-playing-type portion 14 of game 10 prominently. These screens also may include links for the user to return to main screen 24 or to access paytable screen 50.

Slot-type game 12 may include the following rules:

Payline wins are multiplied by the amount bet per line;

The highest win amount is paid on each selected payline;

Coinciding wins on different lit lines are all added to a total;

Scatter wins are multiplied by total bet and added to payline wins;

All wins occur on selected paylines only, except for scattered symbol wins, which pay anywhere in view;

Feature wins are added to scatter and payline wins;

All symbols pay from left to right only except scattered symbols, which pay anywhere;

Wildcard symbols may appear on select reels, e.g., only on reels 1-4; and The wildcard may substitute for all other symbols and may work only in conjunction with all other symbols, except the scattered symbol.

Returning to FIG. 5, game 10 may include a main ticker 54 for displaying various messages to the player. For example, as stated above, main ticker 54 may display the number of spins remaining or the total balance won during a spin or during a session. Other messages displayed on main ticker 54 may include: a standard good luck message, a win message (including amount), a return from bonus game message, a number of free spins counter (if free spins are available in main game), and a return from free spins message (if free spins are available in main game).

Role-Play-Type Game Portion with Features

Role-play-type game 14 may include a plurality of features 16 in which the player may earn both rewards and ability points 104. Features 16 may be triggered in slot-type game 12 in various ways. For example, feature 16 may be triggered if a spin of reels 26 results in a predetermined number of feature-triggering symbols 29 appearing anywhere on the visible portions of reels 26. Feature-triggering symbols 29 may be ability-specific symbols 27. Preferably, however, features 16 may be triggered by the appearance of a predetermined number of scatter symbols 23.

Features 16 may be a way to increase multiplier for slot game and/or may be a source of payout by themselves (and multiplier may apply to this payout and not just to slot payout). A successful feature awards a cash prize and increases the respective ability point for that feature by a predetermined amount, e.g., 1 unit, and an unsuccessful feature may award only a cash prize (or may result in no benefit to the player or even a decrease in ability points), so even an unsuccessful feature still may end up being successful financially. Because a player may know that even an unsuccessful attempt at a feature 16 may result in a cash payout, the player may have increase desire to reach the features 16, which means that the player may play more spins of the slot-type portion 12 of game 10.

Figure 21:
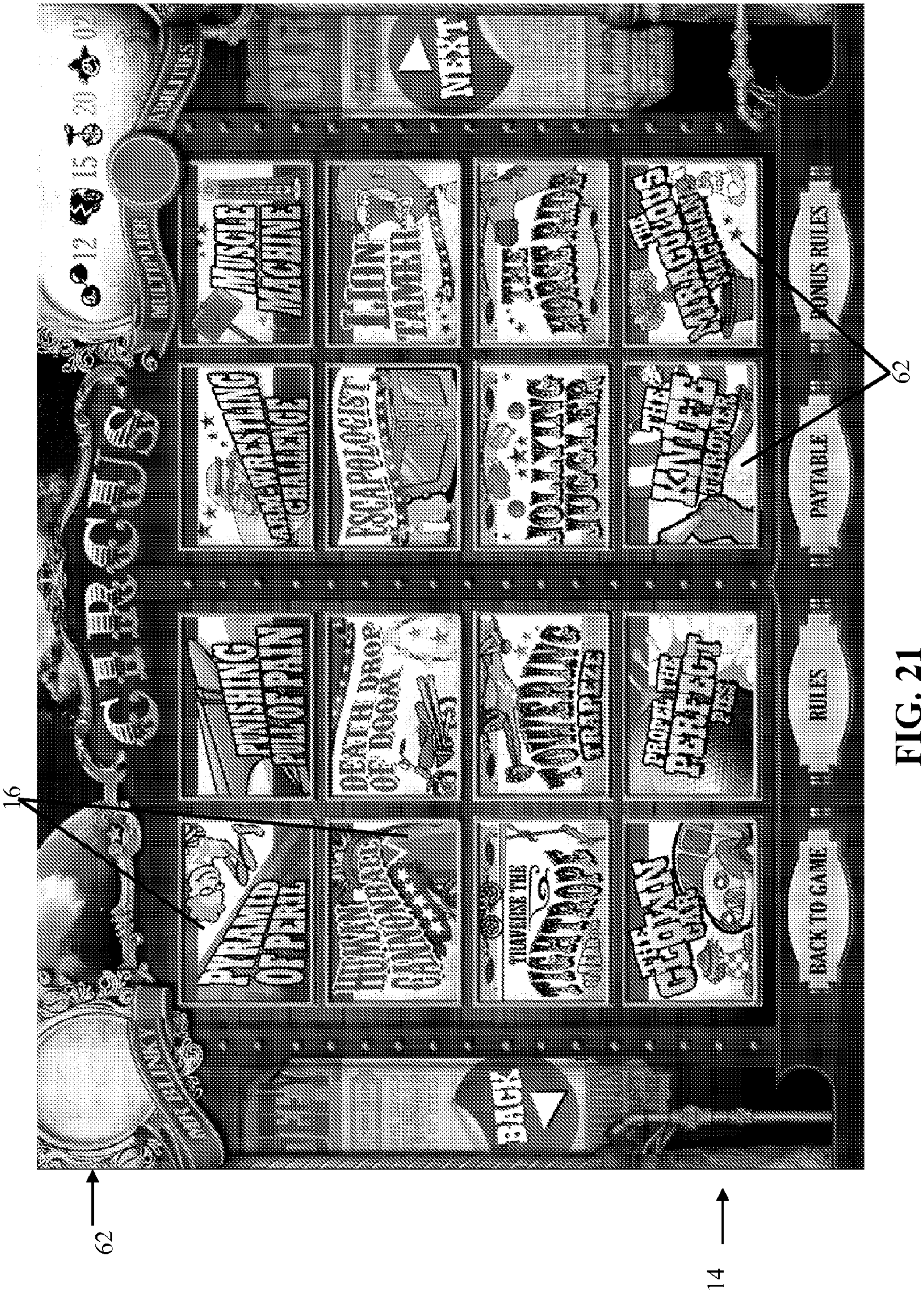
FIG. 21 is a screenshot of a feature lobby screen displaying various possible features in a role-playing portion of a role-playing slot game.

Cash prize may be based on a random multiplier multiplied by a total bet of the triggering game. At the end of the feature, result screen will be opened and may show the feature win amount. Alternatively, the player may be returned to a feature lobby screen 62, as seen in FIG. 21. Feature lobby screen 62 may include a list of each of the features and, in one embodiment, may include indicators of the status of features 16. For example, a feature that has been completed successfully may have a green check mark over the feature, a feature that was failed may have a red X, and unplayed features may have no markings. From the results screen or feature lobby screen 62, clicking on a "CONTINUE" or "BACK TO GAME" button may navigate the player to the main game screen 24.

In one embodiment, there are a plurality of separate feature games, i.e., between about 4 and about 25 games, preferably between about 10 and about 20 games, still more preferably about 16 separate feature games. Each of these features may be awarded at a random time and in a random order. When the feature is activated, e.g., when a plurality of scatter symbols 23 are in view on reels 26, then the system randomly may choose one of the features. This feature then may not be awarded again until the remaining features have been awarded or attempted again until the remaining features have been attempted.

Each character has a plurality of chapters, preferably corresponding to the number of features, for his or her story. By default, one chapter may be available, and the remaining chapters may be locked. In one embodiment, each time a feature is completed, the system may award ability points and a chapter may be unlocked (except for the very first feature completed, which may not unlock a chapter). After all features are completed, features 16 may be reset such that one default chapter may be unlocked with the remainder locked again. Unlocked chapters may not provide any compensatory benefit to player, but they may be pieced together to tell a story about character 100. As player reads each successive chapter, he may want to know more of the story, which further may entice him to keep playing game 10 in an attempt to unlock more features 16.

Once all features have been played, and all abilities or skills are at the maximum level, then the abilities may reset back to 0 or to a default, seeded level, and the game may start over. To compensate the player for resetting the ability levels, a feature multiplier 64 may be increased. For example, the first time the ability levels are reset, the feature multiplier 64 may be reset to *2. Similarly, multiplier 64 may increase by a predetermined amount, e.g., by one, every time the ability levels are reset. The multiplier may have a limit to how high it may go, so as to avoid inordinately large multiplier values. In one embodiment, feature multiplier 64 may be limited at about *5 or *10. Feature multiplier 64 may act to increase the amount of cash prizes earned from feature attempts and may be independent of multiplier 18 for reel-type game 12. Alternatively, feature multiplier 64 and multiplier 18 may be combined to create a larger multiplier that may be used for slot-type game winnings, feature winnings, or both.

Each feature 16 may include its own maximum total of ability points and/or prize amounts to distribute, although a feature 16 may include more than one discreet subpart for which ability points and/or prize amounts may be awarded. As such, maximum ability points and/or prize amounts may be subdivided among the subparts. Some features may be designed so that missing one subpart may prevent the player from accumulating ability points or prize amounts after that point within that feature. Other features may recognize a degree of independence between the missed portion and the remaining portions, such that the player may be penalized for only the missed portion.

Various examples of feature games may include:

Pyramid of Peril (Strength): The player's character holds up a human pyramid while the player picks a spot onto which the next acrobat jumps. A maximum of 9 chances are given to the player to form the pyramid. Each acrobat landing without the pyramid collapsing may result in the game awarding a cash amount and may keep the player eligible to win an ability point. Once the first acrobat fails, however, the player may lose his chance at winning an ability point and instead may be limited to receiving cash amounts. In another embodiment, simply accessing the feature may result in a cash prize, regardless whether or not the acrobat collapses the pyramid. This cash prize may be based on a random multiplier multiplied by the total bet of the triggering game. If all acrobats jump up without collapsing the pyramid then the feature is a success. If the pyramid collapses in any of the 9 chances, then the feature is a failure and the feature game ends, with the player being awarded the accumulated cash prizes. In contrast, a successful feature may award one ability point for Strength along with the accumulated cash prizes. Like the other features, this feature may include a success yes/no flag so that the system may recall that this feature previously has been attempted and possibly completed.

Human Cannon Ball (Courage): This feature is based around a human cannonball. The player selects how much gunpowder to use in the cannon from among a plurality of options. The cannon also may move towards or away from a target and/or the barrel may rotate up and down. The player clicks on a "FIRE" button, at which point the fuse is lit, e.g., by a clown, and the cannon fires. Player's character is then launched across the circus ring with the objective of landing in a safety net. If the character lands in the safety net, then the feature is a success and one ability point may be added for Courage. The player also may be awarded a cash prize. On the other hand, if the character misses the safety net, then the feature is a fail and only cash prize may be given. The cash prize may be based on a random multiplier, multiplied by the total bet of the triggering game.

The Clown Car (Showmanship): The player selects 5 clowns, which get into a clown car one by one. Each selected clown walks to the car and gets in. The car will either stay together or fall apart. Each clown that gets in without the car falling apart results in the player being awarded a cash amount and maintains the player's eligibility for an ability award point. However, any clown can make the car fall apart. If all selected clowns get in and the car is still in one piece, the car drives off and the feature is a success. One ability point may be awarded for Showmanship, along with the accumulated cash prizes. In contrast, if the car falls apart, then the feature is a failure and player is awarded only the accumulated cash prizes from successful clowns. In this feature, a cash prize may be based on a random multiplier multiplied by the total bet of the triggering game. This feature is a series of wins to make up a total win and, like each of the other features, also may include a success/fail flag in order to determine the status of the feature 16. A success will mean that all 5 clowns are successful, and 5 corresponding amounts will be won. Although only one ability point may be rewarded, it still is possible that there will be 1, 2, 3, 4, or 5 wins to give the total cash award.

Traverse The Tightrope Of Terror (Balance): The character is required to ride a bike across a tightrope to a safe platform. This is done by the player pulling a plunger, which affects how far the character goes across the tightrope. The player may pull back and releases the plunger, which may cause a clown to kick the character on the bike across the tightrope. The feature is a success if the character stops on the safe platform. The feature is a failure if the character falls off the tightrope. If the feature is a success, one ability point is awarded for Balance, along with a cash prize. If the feature is a failure, only the cash prize may be awarded. Cash prize is based on a random multiplier, multiplied by total bet of the triggering game.

Propel The Perfect Pies (Showmanship): In this feature, the player throws custard pies at various clowns. The player chooses a clown to throw a pie at, and the pie will either hit the target or miss. Each pie thrown wins a cash prize, regardless whether it hits the target or not. A cash prize may be based on a random multiplier, multiplied by total bet of the triggering game. In another embodiment, the multiplier may not be random, but may depend on the total number of clowns hit. The player is given a total of 3 pies to throw, and if all 3 pies hit the target then the feature is a success and one ability point may be awarded for Showmanship, along with the accumulated cash prizes. If any one of the 3 pies misses, then the feature is a failure and the feature game may end without the opportunity to throw the remaining pies, i.e., the player may win only the accumulated cash prizes for pies hitting their target prior to the miss.

Punishing Pull of Pain (Strength): Player selects an object from the possible choices. The character has to drag a heavy object across a distance, for example by pressing the Z and X keys on a keyboard continuously to move the character and to pull the object across the course. If the character gets to the finish line, the feature is a success and player is awarded one ability point for Strength, as well as a cash prize. If the character collapses while pulling, then the feature is a failure and the player is awarded a cash prize only, which may be proportionate to the distance traveled or may be a set amount regardless of the distance traveled. In one embodiment, the reality may be that however fast or slowly the user presses the keys, success or failure may be determined by a random number generator. If the system requires a fail, then the character will collapse before the end. Cash prize may be based on a random multiplier, multiplied by the total bet of the triggering game.

Death Drop of Doom (Courage): The character has to ride a motorbike across the ring of fire and land on the other side. The revs of the bike are shown, and the player presses “GO” when he believes that the revs are sufficient. The character then goes down the ramp and makes the jump. Success or failure may depend on the revs where the player stopped, with various failure outcomes contemplated, including, e.g., crashing, lighting on fire, falling short of the other side, etc. In another embodiment, however, success or failure may be a random-number generated event independent of the revs selection, again with various fail outcomes. If the character successfully lands on the other side, then the feature is a success and one ability point is awarded for Courage along with a cash prize. If a feature is a failure, player is awarded a cash prize only. Cash prize is based on a random multiplier, multiplied by total bet of the triggering game.

Towering Trapeze (Balance): Two trapeze artists are swinging on trapezes with player’s character being held by one of the trapeze artists. The character jumps between the 2 trapeze artists, winning a cash prize for each jump, whether it is successful or not—although successful jumps may win larger prizes. Player’s character is shown being held by one of the trapeze artists, with them swinging backwards and forwards. The player presses “GO” to jump between the 2 trapeze artists. The jump button is only enabled when it is possible to jump with a possibility of succeeding. For example, if the artists are swinging backwards, then the button is disabled. Each jump will either succeed or fail. Cash prize is based on a random multiplier, multiplied by total bet of the triggering game. Player gets to jump a maximum of 3 times. If all 3 jumps are successful then the feature is successful, and one ability point is awarded for Balance as well as the accumulated cash prizes. If the character falls, then the feature is a fail and the feature ends with the player being awarded accumulated cash prizes only.

Escapologist (Courage): The character is tied and suspended above a tank full of electric eels, with a candle burning the rope. The player presses Z and X keys on the keyboard continuously to make the character wriggle and to try to escape, although first contact with Z or X key may cause rope to start burning through. The feature is a success if the character escapes and leaps to the floor before the candle burns through the rope. The feature is a fail if the candle burns through the rope and the character falls into the tank. A successful feature awards one ability point for Courage along with a cash prize. If the feature is a failure, player is awarded a cash prize only. Cash prize is based on a random multiplier, multiplied by total bet of the triggering game.

Lion Tamer (Courage): The character places his/her head inside the lion’s mouth. Click on “INSERT HEAD” button to place the character’s head inside the lion’s mouth and to start a win counter counting up. The character’s head stays inside the lion’s mouth until the “REMOVE HEAD” button is clicked, which can be at any time. When this button is clicked, the lion may bite and the character either succeeds or fails to pull out his/her head before the lion closes its mouth. If the player does not click on the “REMOVE HEAD” button, the character’s head may stay inside the lion’s mouth until the lion gets bored and bites. In one example, this may result in an automatic failure. In another example, when the lion begins to bite, the character automatically may try to pull out its head before the lion closes its mouth. For every three seconds the head is inside the lion’s mouth, a cash prize is added to the total. Cash prize is also awarded when the lion bites, irrespective of whether or not the character successfully pulls out his/her head before the lion closes its mouth. Cash prize is based on a random multiplier, multiplied by total bet of the triggering game. If the character successfully pulls its head out before the lion bites and closes its mouth, then the feature is a success. One ability point may be awarded for Courage, and the player also may be awarded accumulated cash prizes. If the character fails to remove his/her head before the lion closes its mouth, then the feature is a failure and only the accumulated cash prize is awarded. However, the player may be required to keep the character’s head in the lion’s mouth for a minimum amount of time before pulling it out in order to qualify for a successful feature. If the player pulls the character’s head out successfully, but before this minimum time elapses, the player may fail but get an insurance bonus to add up to the required win. In other words, the player mail fail the feature, but the cash prize may meet a predetermined minimum threshold, which may keep the game at a desired return to player ratio.

The Horse Ride (Balance): The character rides a horse, doing acrobatic tricks. Player may choose a plurality of tricks to perform from among the available tricks, which the character then attempts to perform. Each trick performed without falling off results in a prize being awarded. The cash prize may be based on a random multiplier, multiplied by the total bet of the triggering game. If all chosen tricks are performed successfully without falling off, then the feature is a success and the player may be awarded one bonus ability point for Balance as well as any accumulated cash prizes. If the character falls off during any trick, the feature ends and is a failure, and the player only may be awarded the accumulated cash prizes.

Muscle Machine (Strength): The player selects a tool from the options available and uses the tool to try to ring the bell at the top of a column. Player is given a single chance only. The player presses the strike button and the character is shown hitting the strength tester, which will show the clanger rising up. If the bell is hit/rung, the feature is a success and one ability point may be awarded for Strength, along with a cash prize. If it is not rung, then the attempt is deemed a failure and the player is awarded a cash prize only.

Miraculous Magician: (Showmanship) The character is dressed as a magician and picks objects from a magic hat. Player is given 3 chances in the feature. Player clicks the magician hat and an object is pulled out, each awarding a cash prize. Cash prize is based on a random multiplier, multiplied by total bet of the triggering game. If the character pulls out a predetermined item, e.g., a flower bunch or rabbit, then it is a success. If the character pulls out an object other than a flower bunch or rabbit, then that attempt is a failure, although a cash prize may be awarded. In another embodiment, the system may include a “clap-o-meter” to gauge how successful the pull was. If the meter reads high enough that it is deemed successful, then the player may win one ability point for Showmanship, as well as his accumulated winnings. If not, then the player may win only the accumulated winnings.

Jollying Juggler (Balance): The character has to juggle various items while riding a cycle or standing on a ball. The feature starts with the character peddling on a cycle or standing on a ball, juggling a plurality of small balls, e.g., about 3 balls. A plurality of second items, e.g., about 3 other items then may be thrown up in the air, one at a time, for the character to add to its juggling. A cash prize may be awarded for each item thrown, regardless whether or not the item is juggled successfully, and the cash prize may be based on a random multiplier, multiplied by a total bet of the triggering game. If any object causes the character to fall from the cycle, or to drop a ball, then the feature is considered a failure such that the player may be awarded only the accumulated cash prizes. If all 3 objects are juggled successfully, then feature is a success and one ability point may be awarded for Balance along with the accumulated cash prizes.

ARM-Wrestle Challenge: (Strength): The character arm-wrestles a strongman, with the character's arm shown in a starting position. Pressing Z and X keys on the keyboard continuously may cause the character to fight with the strongman for leverage. Provided the player attempts to win and presses the keys, winning or losing may be determined by a random number generator. If the player is to succeed, then at some point the player will win the challenge. If the player is to fail, then at some point the player will lose the challenge, although the player wins an amount at the end. If the player wins, the feature is successful, and the player is awarded one ability point for Strength as well as a cash prize. If the feature is a failure, the player is awarded a cash prize only. Cash prize is based on a random multiplier, multiplied by total bet of the triggering game.

The Knife Thrower (Showmanship): The character's hand is shown holding a knife, and the player is given 3 knives to throw at a spinning board with a clown. Player uses a crosshair to choose where to aim. The knife will either hit the board or miss the board, although this may be determined randomly or as a result of the player's ability to aim. A cash prize may be awarded for each throw, whether or not the knife hits the board, with the prize based on a random multiplier, multiplied by total bet of the triggering game. If a knife misses the board, the feature is a failure and is over, and the player is awarded accumulated cash prizes only. If all 3 knives hit the board then the feature is a success and one ability point is awarded for Showmanship, as well the accumulated cash prizes.

Special feature: Once all 16 features are completed for a particular character, a special feature is triggered automatically, awarding a cash prize. Cash prize for this special feature is based on a random multiplier, multiplied by the current total bet. The cash prize is shown on a window, which pops-up after the last feature is completed. Click on "PLAY AGAIN" to navigate back to the main screen. All 16 features then may be reset and can be played again.

The exemplary features described above are set forth as games of chance. In another embodiment, however, features 16 in role-playing-type game 14 may be skill-based. In still another embodiment, the player may have the option to select between random event and skill-based features 16. In this embodiment, skill-based features may be made more difficult than random event features. However, rewards for completing skill-based features successfully may, therefore, be increased over random feature rewards.

For example, in the Muscle Machine feature, a moving indicator may move quickly along a power scale. If the player hits the strike button at the proper time, i.e., when the indicator is within a predetermined range of the scale, then the clanger will rise sufficiently to strike the bell. If the player's reflexes are off, however, and the indicator is outside the predetermined range, then the clanger will fall short and the feature will not be completed successfully. Similarly, in the tightrope game, the character may carry a pole for balance, and the player may have to use the keyboard arrow keys to shift the character's weight to ensure that the character does not fall to one side or the other. Failure to press the proper key at the proper time may cause the weight to shift too far to one side to be able to recover, causing the character to fall.

In another example, a feature may be memory-based, such as remembering the location of paired cards that are shown face down in a grid. The player may have a certain number of chances to match the cards in order to complete the feature successfully. However, if the player's memory is not good enough, too many chances will occur, and the feature will be failed.

In still another example, the player may need to navigate an obstacle course, e.g., by driving the clown car around the ring while avoiding obstacles such as jugglers, elephants, fire-breathers, etc. The faster the player completes the course, the larger his bonus may be. However, the obstacles may be more difficult to avoid. In addition, sudden obstacles may appear seemingly out of nowhere. For example, the juggler may be juggling knives and may drop one in the character's path. Failing to avoid the knife may result in a slashed tire and a failed feature. As such, this game may test the player's concentration and/or dexterity.

Effect of Ability Points

Returning to slot-type game portion 12, the character's abilities then influence the reel payouts. This happens by triggering reel win multipliers 18 when all of the abilities meet a minimum threshold value. For example, when all 4 abilities have increased to a point level of 2, then all reel wins may be multiplied by 1.5. As the ability points 104 increase, the multiplier 18 increases. The correlation may not be linear, however. For example, multiplier 18 may only increase a fraction of a point for every ability point increase. In addition, multiplier increases may occur only after every other ability point increase.

Lower-value ability point increases may correspond to larger multiplier increases as compared to higher-value ability point increases. In the former case, the game 10 may entice players to play more when just starting out by rewarding them with larger multipliers 18. Similarly, once players have been playing for a while, the game 10 may not need as much impetus to keep players playing and may be able to make do with smaller multiplier increases. In addition, since a large number of ability points 104 are possible, multiplier 18 may taper off so that multiplier value does not get unsustainably large.

This multiplier may start from 1, i.e., no multiplying, and may increase up to around 5. Multiplier amounts may be determined based on the lowest number of ability points 104 achieved for each ability 102. If, for example, strength is at level 6 and the other three abilities are at level 2, the multiplier awarded may be that for level 2. The same result may obtain if three abilities are at level 6 while a single ability is at level 2.

In one embodiment, wins in slot-type game 12 may be multiplied by the ability multiplier to increase the player's winnings. In another embodiment, feature wins in role-playing-type game 14 may be multiplied by the ability multiplier. In yet another embodiment, all cash rewards earned in role-playing-type game 14, whether from feature wins or feature losses, may be subject to multiplier. In still another embodiment, multiplier may multiply all winnings, from both slot-type game 12 and role-playing type game 14. These rules also may apply to feature multiplier 64.

As seen in FIG. 1, ability points 104 may be shown at top right corner of the game screen 24, as may multiplier 18. Main screen 24 also may include a drop-down section 66 that shows the relative ability levels next to a multiplier scale. In this way, the player may be able to quickly and easily analyze his ability points and the number of points necessary to reach the next multiplier level 18. Both ability points 104 and multiplier 18 also may be shown throughout the game, e.g., on the character selection screen, the payout table screens, the rules screens, and the feature lobby screen.

As multiplier 18 changes, reel-type game 12 may employ a different set of bands of reels 26 for each multiplier level. As the multiplier increase, the set of reel bands being used will change to the relevant one. Different bands may result in different odds of winning, so the game may be able to adapt in order to regulate the frequency and amounts of payouts. This enables the return to player (RTP) and hold to remain substantially the same regardless of multiplier level. In addition, modified reel sets may make ability symbols and/or feature-launching symbols appear more or less frequently, which may regulate the rate at which a player may move to the next multiplier level.

Reels 26 may be adjusted based on the current multiplier value and on an average number of games needed to get to the next multiplier level. Reels 26 associated with higher multipliers 18 may have decreased odds of line wins, scatter wins, feature launching, and/or ability occurrences. However, due to the increased payout caused by multiplier 18, a theoretical return to player may remain about the same as for a non-multiplier game.

Overview of Asset Formats

All graphical assets may be Flash Movie Clips. Except for still photos and video clips, all assets preferably are vector-based to allow resizing.

All sound files may be stereo Way files at 22 hz.

Window Size and Behavior

In one embodiment, the total window size of a slot game may be 806×629 pixels, however, other window sizes are possible. This includes the Window Title bar and the window edges. The close window control operates as expected, and the window will not close during a spin, a free spin set of spins or a bonus game.

Loading Sequences (For Flash Casino Downloads Only)

Game 10 may employ a Flash Movie asset that is shown while the game is downloaded. Game 10 may run on a computer connected to the Internet, such as a personal computer or a wireless device such as a cell phone or multimedia device.

This Loading Sequence may be shown when the game is being downloaded in the Flash Casino. In the Download Casino, the game will have been downloaded before the game is launched (either through the silent download mechanism or in response to the user clicking on the game icon). The Loading sequence should show a percentage loading bar with kb downloaded and total kb to be downloaded also shown as text below the bar, e.g., "downloaded_so_far Kb/total_size KB." However, this asset may not be included in a download version of the game.

Splash Screen: A still screen may be shown when the game is launched and the user is presented with a buy-in popup. This can be the first frame of the intro sequence, which may allow the user to transition from this splash screen, through the intro to the main game screen.

Intro Sequence: Games can have an Intro Sequence, e.g., a movie clip with or without audio and/or a textual display. This movie clip should be no longer then 3 seconds. The Intro Sequence should end up with the main game screen being revealed. The user must be able to click anywhere on the game window to skip the intro and go straight to the main game screen.

Adding Funds to an Account

To add funds to your account, click on "DEPOSIT" in the "Cashier" menu, then select the desired deposit option (Play Anywhere clients) or click on "DEPOSIT" in the "Cashier" option on left panel in Main Lobby, then select the desired deposit option (Download clients). You can also add funds to your account by clicking on "REBUY" on the game screen (which may appear when the balance gets low) and then clicking on "CASHIER." The time taken to transfer funds and the fees charged will vary depending on which deposit option is chosen.

If a game balance drops below the minimum bet, a Buy-In window will be presented automatically. To add funds, click on the "DEPOSIT" option in the "Cashier" menu or option in the Main Lobby, then select the desired deposit option, or click the "CASHIER" button in the "Buy-In" window of any game.

Click on "GAME LOGS" to view the logs of the games you've played.

Click on "REBUY" to buy more credits into the game from your PartyAccount.

Click on "EXIT GAME" to leave the game and return to the lobby.

While the foregoing written description of the invention enables one of ordinary skill to make and use what is considered presently to be the best mode thereof, those of ordinary skill will understand and appreciate the existence of variations, combinations, and equivalents of the specific exemplary embodiments and methods herein. The invention should therefore not be limited by the above described embodiments and methods, but by all embodiments and methods within the scope and spirit of the invention as claimed.

What is claimed is:

1. A game configured to be executed by a computer having at least a processor, the game comprising:

a plurality of characters, each of the plurality of characters having a plurality of abilities;

a slot game, executed by the processor, the slot game including a multiplier that is applied to a randomly generated outcome of the slot game, and the slot game including a plurality of reels displaying a plurality of symbols, including at least one ability symbol corresponding to each of the plurality of abilities; and a role-playing game that is executed by the processor in response to an event of the slot game, the role-playing game including at least one opportunity for a player to increase the multiplier of the slot game using at least one of the plurality of characters;

wherein the slot game and the role-playing game are arranged around a common theme.

2. A game accord to claim 1, wherein said player can select from among said plurality of characters.

3. A game according to claim 2, wherein said plurality of abilities have variable values.

4. A game according to claim 3, wherein said variable value of one of the plurality of abilities is increased when said corresponding ability symbol is displayed on one of the plurality of reels after said reels are spun and come to rest.

5. A game according to claim 4, further comprising a plurality of gaming sessions;

Wherein a value of at least one of said plurality of abilities is modified in a first game session and said at least one of said plurality of abilities has said modified value in a second gaming session.

6. A game according to claim 1, wherein the at least one opportunity includes a plurality of opportunities to increase said multiplier; and wherein each of said opportunities corresponds to a respective one of said plurality of abilities.

7. A game according to claim 1, wherein a minimum value for each of said plurality of abilities determines said multiplier.

8. A game according to claim 1, wherein said event includes the randomly generated outcome of said slot game.

9. A game according to claim 1, wherein success of said at least one opportunity to increase the multiplier of the slot game is random.

10. A game according to claim 1, wherein success of said at least one opportunity to increase the multiplier of the slot game depends on said player's skill.

11. A game according to claim 1, wherein said player receives compensation in each of said slot game and said role-playing game.

12. A game configured to be executed by a computer having at least a processor, the game comprising:

a plurality of user-selectable characters, each character having at least one ability having a modifiable value;

a slot game including:

a plurality of reels having a plurality of symbols;

a plurality of pay lines, each pay line including one symbol from each reel and for each pay line, each symbol is adjacent or diagonal to a successive symbol along the pay line; and a multiplier that increases an amount of compensation for a winning outcome in the slot game; and a role-playing game including:

a plurality of features, each of the plurality of features including a respective opportunity to obtain compensation and an opportunity to augment the multiplier of the slot game;

wherein, at least one of the plurality of symbols of the slot game corresponds to each of the abilities of the user-selectable characters.

13. A game according to claim 12, wherein each of said plurality of features of said role-playing game corresponds to said at least one ability, and wherein completing a feature successfully increases said modifiable value of said ability.

14. A game according to claim 12, said game including a plurality of ability value thresholds, wherein when said modifiable value of the at least one ability surpasses a threshold, the multiplier of the slot game is increased.

15. A game according to claim 12, wherein each of said plurality of user-selectable characters has a plurality of abilities, each ability having a modifiable value, and said game includes a plurality of ability value thresholds;

wherein each of said modifiable values surpassing a common threshold increases said slot game multiplier.

16. A game according to claim 12, said game comprising a first gaming session and a second gaming session;

wherein said game is exited after said first gaming session and reopened before said second gaming session; and wherein said game retains a value of said slot game multiplier and said modifiable value of said at least one ability of each user-selectable character from said first gaming session to said second gaming session.

17. A game according to claim 12, wherein said slot game and said role-playing game share a common theme.

18. A game configured to be executed by a computer having at least a processor, the game comprising:

a character selection screen for selecting one of a plurality of characters, said character having a plurality of abilities with modifiable values;

a slot game for obtaining compensation based on an outcome, the slot game having a main screen displaying a plurality of reels with a plurality of symbols, a bet indicator, a bet adjuster, a number of pay lines played indicator, a number of pay lines played adjuster, and a multiplier value, wherein compensation for a winning outcome is increased based on said multiplier value; and a role-playing game that is accessed when a predetermined symbol or symbols are displayed on said reels when said reels are in rest condition, said role-playing game including a plurality of opportunities for modifying said modifiable values and obtaining compensation, wherein each opportunity is presented on a separate screen.

19. A game according to claim 18, wherein a player of said game can switch characters among the plurality of characters during at least one of the times including: before a first spin of said slot game, between spins of said slot game, before attempting an opportunity in said role-playing game, or after attempting an opportunity in said role-playing game.

20. A game according to claim 18, wherein each of the plurality of characters has a different core ability selected from among said plurality of abilities, said core ability having a higher initial value than the values of other abilities among said plurality of abilities.

* * * * *